United States Patent [19]
Amano

[11] Patent Number: 5,691,747
[45] Date of Patent: Nov. 25, 1997

[54] ELECTRONIC POINTING DEVICE

[75] Inventor: Kazuhiko Amano, Suwa, Japan

[73] Assignee: Seiko Epson Corporation, Tokyo, Japan

[21] Appl. No.: 359,753

[22] Filed: Dec. 19, 1994

[30] Foreign Application Priority Data

Dec. 20, 1993 [JP] Japan .................................. 5-320582
Dec. 20, 1993 [JP] Japan .................................. 5-320583

[51] Int. Cl.$^6$ ...................................................... G09G 3/02
[52] U.S. Cl. .................... 345/167; 345/145; 345/156; 345/157; 345/163; 345/158
[58] Field of Search ............................ 345/112, 145, 345/156, 157, 158, 159, 160, 163, 168, 172, 173

[56] References Cited

U.S. PATENT DOCUMENTS

| | | | |
|---|---|---|---|
| 4,302,011 | 11/1981 | Pepper, Jr. ................ | 273/85 |
| 5,262,777 | 11/1993 | Low et al. ................. | 341/20 |
| 5,341,133 | 8/1994 | Savoy et al. ............... | 341/22 |
| 5,349,263 | 9/1994 | Katayama et al. ......... | 310/338 |
| 5,349,370 | 9/1994 | Katayama et al. ......... | 345/159 |
| 5,448,263 | 9/1995 | Martin ....................... | 345/173 |
| 5,485,171 | 1/1996 | Cooper et al. ............. | 345/160 |
| 5,580,719 | 12/1996 | Gervais ...................... | 345/157 |

*Primary Examiner*—Mark R. Powell
*Assistant Examiner*—Vincent E. Kovalick
*Attorney, Agent, or Firm*—W. Glen Johnson

[57] ABSTRACT

A compact, miniaturized pointing device for use with an electronic apparatus, such as a computer, personal data assistant (PDA), or digital watch display screen, is provided to indicate the position of a cursor mark on the display screen. The pointing device includes an elastic member which has a body portion that extends above the surface of the electronic apparatus with a section below the surface including pressure sensitive elements and corresponding position indicators. When a finger is placed on the elastic member, vibrational pressures are generated and pressure signals are propagated through the elastic member reaching the pressure sensing elements housed in the submerged section. The intensity of the propagating signal attenuates with a square of the distance traveled and, therefore, from a determination of the ratio of the magnitude the output voltage signals from the pressure sensing elements, the position of the pressed point on the elastic member can be computed. The pointing device computes the coordinates of the pressed point in relation to the projected pressed point on orthogonal axes of a planar surface at the submerged section, and from these coordinates are utilized by circuitry of the electronic apparatus to correspondingly position the cursor mark on the display screen. A movement of the finger on the elastic member can be translated into a movement vector, and sampling rates are adjusted to follow any velocity rate of the movement vector thereby allowing the screen to accurately reflect the movement of the finger.

25 Claims, 13 Drawing Sheets

CONTROL SIGNAL T

SIGNAL T

SIGNAL T

SIGNAL T

BIASING SIGNAL

BIASING SIGNAL

ELECTRONIC POINTING DEVICE

BACKGROUND OF THE INVENTION

1. Field of the Invention

This invention relates generally to an electronic screen pointing device to assist in the input of data relative to personal computers and other display processing apparatus, for use in conjunction with the display and the manipulation of data on the display screen, and also for use in conjunction with watches, particularly digital watches, to select a particular function in operation of the watch.

2. Background of the Invention

The input of data into personal computers and workstation displays is conventionally performed with the use of keyboards together with pointing devices for assisting in data entry and the selection of other functions on the display, as well as the point of reference or focus of input. These pointing devices specify a determined position for a cursor on a display screen. Such devices fall broadly into two categories.

(1) Absolute Coordinate Type (e.g., Touch Screen Type and Tablet Type)

These type of devices are primarily static devices. For these devices, an external input member is required to correspond with the positions on a display screen, and a position is specified by specifying an area on the external input member. Input operations are performed by touching a transparent electrode on the display screen in the case of the touch screen input type, and by contacting a plate type input device with a pen type device in the case of the tablet input type.

(2) Relative Coordinate Type (e.g., Mouse or Trackball)

These type of devices are primarily dynamic devices. The device is able to move a cursor mark on a screen in terms of the pulsed data derived from planar movements of the pointing device, whose movement vectors (transfer vector per unit time) are provided as input to a computer by transforming the linear movements into digitized pulse data.

The first type of pointing devices suffers from a disadvantage in that the device itself is complex and expensive and, moreover, are not adaptable to use with compact electronic apparatus because of the nature of the device structure. For example, the touch screen structure incorporates a transparent electrode on top of a display screen attached to a fixed size apparatus, thus it is not suitable for making the pointing device alone compact. Similarly, the tablet type device operates on a one-to-one relationship between the screen and the touching area, and also are not suitable for making a compact apparatus.

The relative coordinate type of pointing devices have the following problems. In the case of a pointing device conventionally known as a mouse, it requires a certain amount of space for moving of a mouse housing on a flat surface, as well as two encoders for detecting the x and y components of its movement vector. A trackball has a moving ball and a fixed main body, so that the space for moving the main body is not required; however, it also requires two encoders for detecting the x and y components of its movement vector.

Therefore, to produce a compact pointing device of the relative coordinate type, it is necessary to construct a very precise ball rotation detection device. Furthermore, because the device has moving parts, it is vulnerable to picking up dust and other foreign particles, and presenting a problem of long-term reliability of the device. Recently, optical devices for detecting the x and y components have appeared in the marketplace, but these type of devices require movement on a special pad.

In the meantime, there have been wrist watches capable of, not only displaying time, but also capable of performing various computational tasks, including the input of data, storing data in memory and displaying the data. Such wrist watches are provided with a plurality of switch buttons for selecting a particular function, and keys for the input of data. As a result, the number of function keys is increasing as more functions are offered. It is not only difficult to provide a plurality of function buttons or keys in a limited space of a wrist watch, but such an approach even leads to a situation wherein the operation of the multiple buttons are cumbersome and impairing the process of selecting a desired function.

An alternative would be to use a trackball as the pointing device for selecting a desired function from a screen menu of a computer, but such a device would require not only a rotatable member but also two encoders for detecting the x and y components of the direction of movement. Therefore, such a cursor moving device would not be applicable as a pointing device for such devices, as a wrist watch, where the need is to be small.

It may also be possible to provide a switch or button device to display positive and negative directions on the x and y axes, and to move a cursor according to the display. However, such a device would still require moving parts, such as springs and contacts, and is vulnerable to loss of reliability when the parts are miniaturized or the number of parts is increased.

SUMMARY OF THE INVENTION

It is an objective of this invention to provide an electronic pointing device having a long term service reliability, and which can be miniaturized and operated without involving a mechanical rotating device. According to this invention, this objective has been achieved by means of two further technical objectives.

The first objective is achieved in the provision of a first electronic pointing device for determining a static position on a viewing screen of computing device which comprises an elastic member having an extended upper body portion and a planar bottom surface bonded to a base section for propagation of vibrational pressure signals generated from a pressed point on the extended upper body portion. The pointing device further includes at least three pressure sensing elements disposed on the planar bottom surface for detecting vibrational pressure signals propagated from the pressed point, and corresponding position indicators in the base section providing output position indicating signals corresponding with detected pressure signals. A first computing device provides for computing projection coordinates of the pressed point in accordance with the position indicating signals to define coordinates of the pressed point in relationship to a center of the base section.

According to the first pointing device, a first pointing device, when an user presses on an exposed surface of the elastic member, vibrational pressures are propagated from the pressed point as the center point of initial propagation. The intensity of the propagating pressure signals is attenuated in proportion to the square of the distance traveled. The pressure signals are detected by pressure sensing elements disposed in the base section. The coordinates of the pressed point projected on the base surface are computed from the ratios of signals received by the pressure sensors according to predetermined mathematical formulas. The pressed point can then be specified in terms of the orthogonal x and y axis of the bottom surface with the origin taken at the center point of the bottom surface of the elastic member at the base portion, and a corresponding position on a display screen can be defined by a suitable marking, such as a cursor mark. The device structure does not involve moving parts, and, therefore, a long term service reliability of the pointing device is thereby assured. Since the operation of the device involves pressing on the elastic member and does not involve movement of the elastic member itself, the device does not require a comparatively large amount of space for its operation, rendering the pointing device highly suitable for small electronic apparatus, such as a wrist watch. Computation of the projection coordinates can be performed repeatedly at specific time intervals so that the coordinates can be specified on a continuous basis to the computer device and to the cursor mark on the display screen.

A second objective of the pointing device relates to defining a movement of a pressed point position to another pressed point position in the pointing device. The second objective is achieved in the provision of a second electronic pointing device comprising an elastic member having an extended upper body portion and a planar bottom surface bonded to a base section for propagation of vibrational pressure signals generated from a pressed point on the extended upper body portion. The pointing device further includes at least three pressure sensing elements disposed on the planar bottom surface for detecting vibrational pressure signals propagated from the pressed point, and corresponding position indicators in the base section providing output position indicating signals corresponding with detected pressure signals. A first computing device provides for computing projection coordinates of the pressed point in accordance with the position indicating signals to define coordinates of the pressed point in relationship to a center of the base section and a second computing device provides for computing the position indicating signals at specified time intervals and for computing a movement vector for indicating a positional change of the surface point on the elastic member to new surface point in a given time interval.

According to the second pointing device, a user moves and presses a finger on the surface of the elastic member by a given amount to a new location in the direction of desired cursor mark movement on a display screen. As in the case of the first pointing device, vibrational pressure signals are generated from the pressed point, and as the pressed point moves on the surface of the elastic member, so do the corresponding centers of the propagating signals on the bottom surface of the elastic member. The computational process involves a series of pressed points in a given sampling interval. A movement vector is thus computed to correspondingly move the cursor mark from one position on a display screen to another point on the display screen. The second pointing device is capable of specifying a series of moving points on the surface of the elastic body in terms of relative projected coordinates without the requirement of moving parts. The long term service reliability of the pointing device is thereby assured. The second pointing device shares the same advantages as the first pointing device, such as compact space placement, miniaturization, and ease and accuracy of operation.

An aspect of the pointing device is that the velocity of the movement vector can be computed. If the pressed point is moved rapidly over the surface of the elastic member, the sampling frequency is adjusted so that the movement vector is computed on a finer time scale by more frequent sampling of the movement vector.

Another aspect of the pointing device is that the elastic member is bonded by adhesive to the base section housing the pressure sensing elements or members. This arrangement prevents the pressure waves to be applied directly to the pressure sensing members and provides for higher accuracy in the determination of the pressed point position.

A further aspect of the pointing device is that the number of pressure sensing elements can be increased from three to four, and the four elements may be disposed equidistantly from the center in orthogonal symmetry. Because of the orthogonal symmetry of the four elements, the pressure signals detected by the four elements can be compensated so as to equal each other to more accurately define the position of the precise pressed point on the surface of the elastic member. Also, this arrangement enables the propagation distance along the orthogonal axis to be minimized, as compared with the case of three pressure sensing elements, for ease of the computational method.

Still another aspect of the pointing device is that the three or more pressure sensing elements can be fabricated on or in a base section comprising conventional semiconductor material. This arrangement enables the use of semiconductor technology, which provides for precision and miniaturized par manufacture.

A still further aspect of the pointing device is that the pressure signals can be detected by three or more pressure sensing elements housed in respective cavities formed in the base section, each cavity having an opening through the bottom surface of the base section. This arrangement of the elements increase the sensitivity of detection by enabling them to detect minute pressure changes in the internal cavities.

A still further aspect of the pointing device is that the cavities may be filled with a liquid like material. This will minimize the attenuation of the pressure signals transmitted through air in the cavities thereby increasing the sensitivity of detection.

Another aspect of the pointing device is that each base section cavity may be connected through a corresponding pressure transmission tube or channel to a position sensor so that each pressure sensing element can detect a pressure change within its corresponding pressure transmission channel.

A still further aspect of the pointing device is that the cavities and corresponding pressure transmission channels may be filled with a liquid like material thereby making pressure detection independent of the placement of the position indicators.

A still further aspect of the pointing device is that the pressure transmission channels may be comprised of an elastically rigid material thereby increasing the detection sensitivity of the pressure signals.

A still further aspect of the pointing device is that the base section cavities and the rigid pressure transmission channels may be filled with a liquid like material to further increase the detection sensitivity of the pressure signals.

A still further aspect of the pointing device is that the pressure transmission channels can be aligned toward a common center point of the base section. As a result, it is possible to provide many pressure detection devices in a given area of the base section, improving accuracy, while contributing to the lowering of the cost of the pointing device.

Another aspect of the pointing device is that the surface of the elastic member may be covered with a layer of material having a higher modulus of elasticity than the material of the elastic member. As a result, it is possible to minimize the propagation of surface pressure waves laterally along the elastic member and increase the signals directed to the position indicators, resulting in higher intensities of the pressure signals received at the pressure sensing elements.

A still further aspect of the pointing device is that the surface covering may be comprised of a large number of small covering pieces or a plurality of surface projections. By having such an arrangement for the surface covering of the elastic member, the choice of selected pressed point becomes somewhat restricted; however, because the surface propagation is minimized, the level of pressure signals detected by the pressure sensing elements is increased.

Another aspect of the pointing device is that the pointing device can be disposed on a surface region of a hand held casing of an electronic apparatus, such as a personal data assistant (PDA), with exposure of the elastic element on the top surface of the apparatus. This arrangement of the pointing device allows the user to specify coordinates by simply pressing on the elastic element of the pointing device.

A still further aspect of the pointing device is that the pointing device can be provided on a portable electronic device worn by the user, such as a digital wrist watch, and permit the utility of many computational functions. The coordinate requirements for the display of the device is achieved by defining the projected coordinates employing the pointing device by simply pressing on the exposed area of the elastic element on the surface of the device.

Another aspect of the pointing device is that the pointing device is provided with pressure sensing elements which function as variable resistance elements which are electrically biased so as to provide output signals corresponding to applied pressure signals received from the elastic member. The biasing can be applied equally and continually to each of the pressure sensing elements so that the pressure signals detected are compared under the same operating conditions.

A still further aspect of the pointing device is that the biasing is applied periodically, instead of continually, and only during the duration of measurements for achieving power conservation.

A still further aspect of the pointing device is that the biasing is applied periodically to each of the resistance elements for achieving power conservation.

A still further aspect of the pointing device is that the applied biasing are applied current pulses to provide for circuit simplicity as well as power conservation.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments will now be explained with reference to the figures. First, the construction details of the pointing device will be explained, followed by explanation of the principle of projection coordinate position determination, followed by explanation of the movement vector. Four embodiments, I to IV, are presented to explain the features and application possibilities of the compact pointing device of the present invention.

(I) FIRST EMBODIMENT

I-1 Construction

Figure 1:
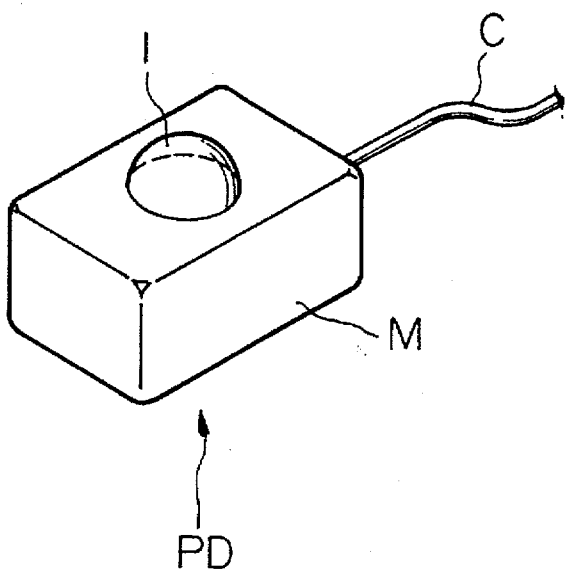
FIG. 1 is a perspective view of a first embodiment of a pointing device of this invention.

FIG. 1 is an external view of the pointing device PD of the present invention. As shown in FIG. 1, the pointing device PD comprises a casing M and a roughly semispherical elastic member 1 disposed on a top surface of casing M. A cord C is provided through a side surface of casing M for transmitting operational data from the pointing device for specifying coordinates to a personal computer and other data processing devices. Other details will be explained later.

I-1-1 Position Sensor

Figure 3A:
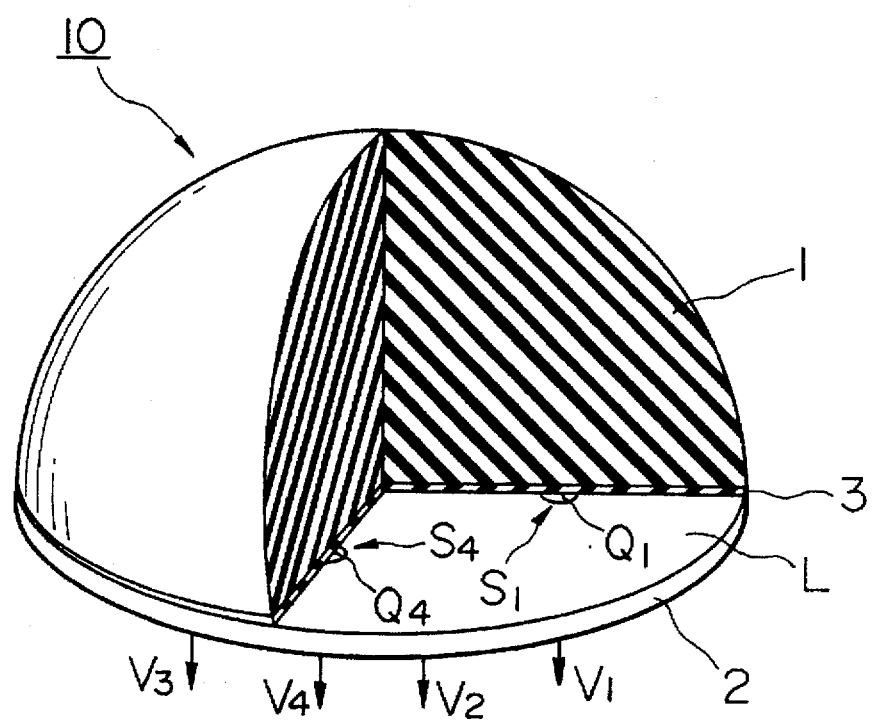
FIG. 3A is a perspective view with a partial cut-away section of the position sensor or indicator.

In FIG. 3A, a partial cut-away view of the position sensor 10 shows an interior configuration of the position sensor 10. As shown in FIG. 3A, a position sensor 10 is provided on base 2 of semispherical elastic member 1, and performs the function of computing projection coordinates of a pressed point generated on elastic member 1. As shown in both FIGS. 3A and 3B, position sensor 10 comprises piezoelectric pressure sensing elements $S_1$ to $S_4$ and elastic member 1 of a roughly semi-spherical shape. The following explanation assumes that elastic member 1 has a perfectly semi-spherical shape.

Piezoelectric pressure sensing elements ("elements", for short), $S_1 \sim S_4$, are disposed on the plane surface L of semiconductor base 2 of elastic member 1, and generate electrical voltages, $V_1 \sim V_4$ in proportion to the applied pressure. Further details of the pressure sensing device will be set forth later.

Figure 3B:
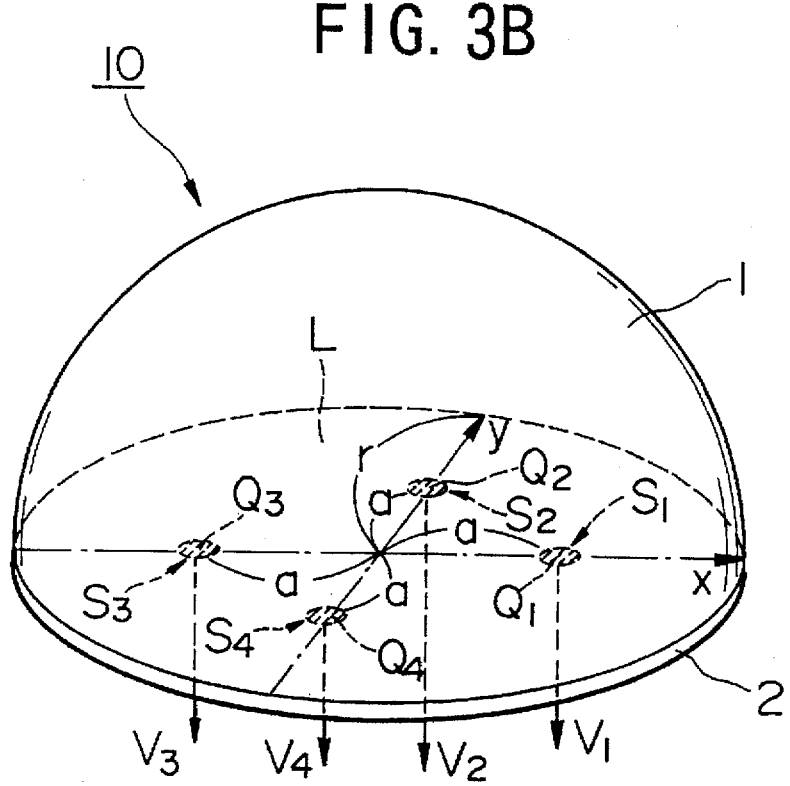
FIG. 3B illustrates the position indicators in relation to the pressure sensing elements.

Elements $S_1 \sim S_4$ corresponds to position sensors or indicators $Q_1 \sim Q_4$, and their coordinates (x,y) are given with respect to the origin (0,0) of the plane surface L and a radius r of elastic member 1. Referring to FIG. 3B, position indicators $Q_1 \sim Q_4$ are represented by the following coordinates defined by x- and y-axes:

(a,0), (0,a), (-a,0), and (0,-a)

where r>a>0 and the positive directions are in the direction of the arrows on the x and y axes. In this illustration, the four points $Q_1 \sim Q_4$ are equidistant from the origin (0,0) by an amount "a".

Figure 4:
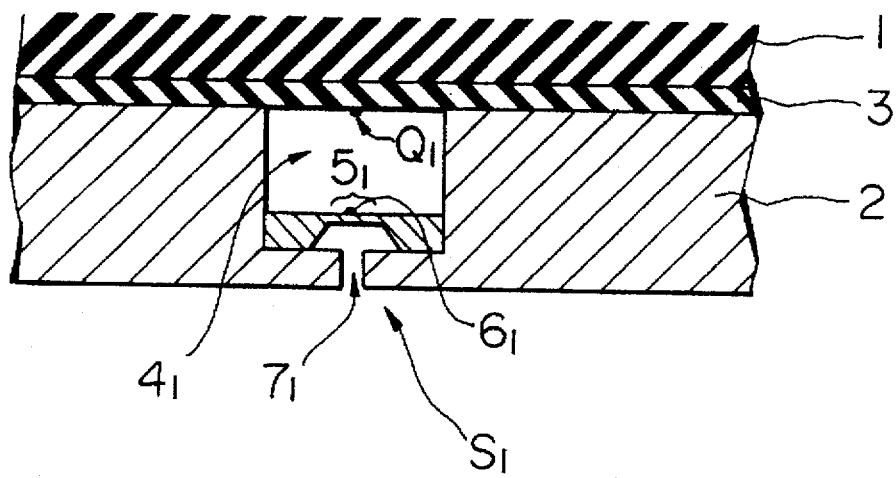
FIG. 4 is an enlarged cross sectional view of the planar bottom section having a position sensor including a bonding interface between an elastic rubber and a semiconductor base section.

Next, the bonding interface between the elements and elastic member 1 will be explained with reference to element $S_1$ and FIG. 4 which shows its device configuration. As shown in FIG. 4, a base section of the position indicator comprises semiconductor base 2 bonded to elastic member 1 with an intervening bonding layer 3. Element $S_1$ is formed within a small cavity $4_1$ in base 2 to correspond with position indicator $Q_1$. Element $S_1$ comprises a diaphragm member (a thin film of several tens of μm thickness) $5_1$, and a strain gage $6_1$ fabricated on top of diaphragm member $5_1$.

Element $S_1$ is fabricated employing known semiconductor etching techniques. In particular, the strain gauge is a piezoelectric device having a p-type resistive layer made by a selective diffusion of impurities (such as boron) in base 2. Similarly, the other elements $S_2 \sim S_4$ are fabricated on base 2, and serve as position indicators $Q_2 \sim Q_3$ by generating a voltage proportional to applied pressure on member 1.

Position sensor 10 generates position information as follows. When pressure is applied on the surface of elastic member 1, pressure waves are generated and propagated through elastic member 1 as elastic waves to apply vibrational forces on cavities $4_1 \sim 4_4$ corresponding to position indicators $Q_1 \sim Q_4$. The strain gauges $6_1 \sim 6_4$ will correspondingly experience strain in response to the pressure differentials (caused by the difference in the pressure in the cavity interior and the outside atmospheric pressure) exerted on gauges $6_1 \sim 6_4$ through opening 7. These pressure variations cause the resistance of gauges $6_1 \sim 6_4$ to correspondingly vary.

The terminal ends of gauges $6_1 \sim 6_4$ are coated with vapor deposited aluminum for providing external electrical connections for processing the output resistance signals by means of known circuitry. The result is a generation of voltages $V_1 \sim V_4$ correspondingly proportional to the signal strength from position indicators $Q_1 \sim Q_4$.

If necessary, cavities $4_1 \sim 4_4$ can be filled with a liquid medium having a low coefficient of thermal expansion (e.g. water, alcohol), or liquid-like material (e.g. gelatin). By so doing, micro-vibrations generated in the cavities may be detected and converted into accurate electrical signals having low attenuation.

I-1-2 Principle of Coordinate Determination

Figure 5:
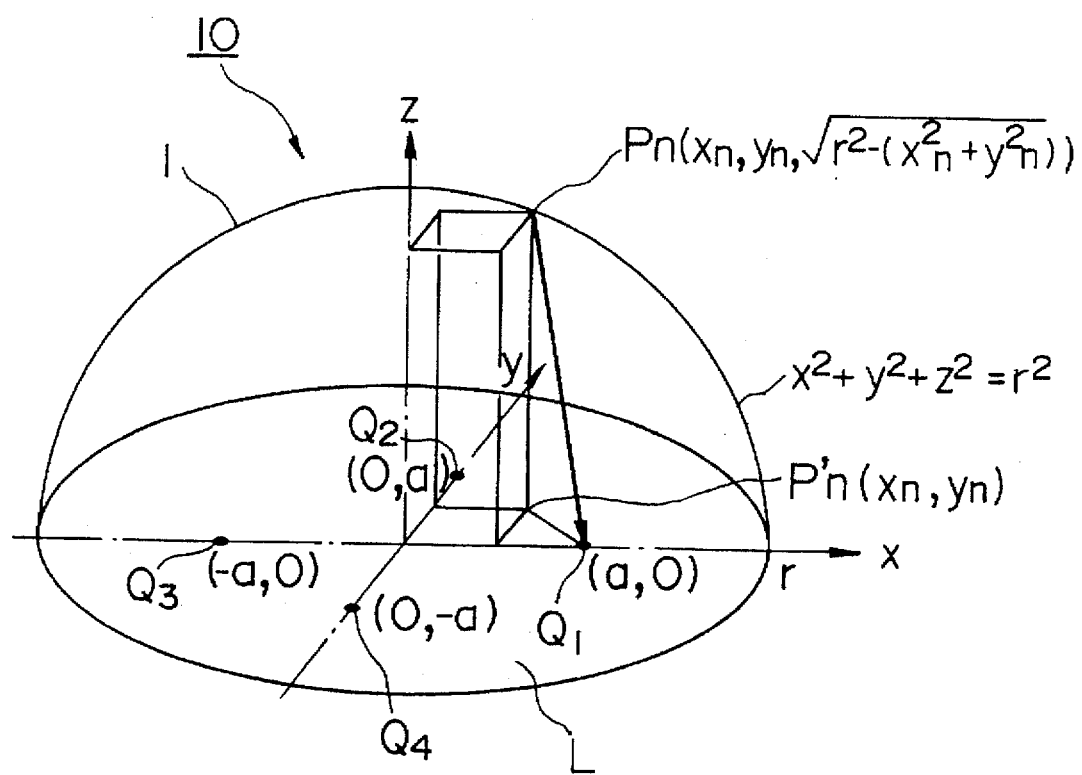
FIG. 5 is an illustration for explaining the principle for determining the projected coordinates in terms of the position indicators disposed on the planar bottom section.
Figure 6A:
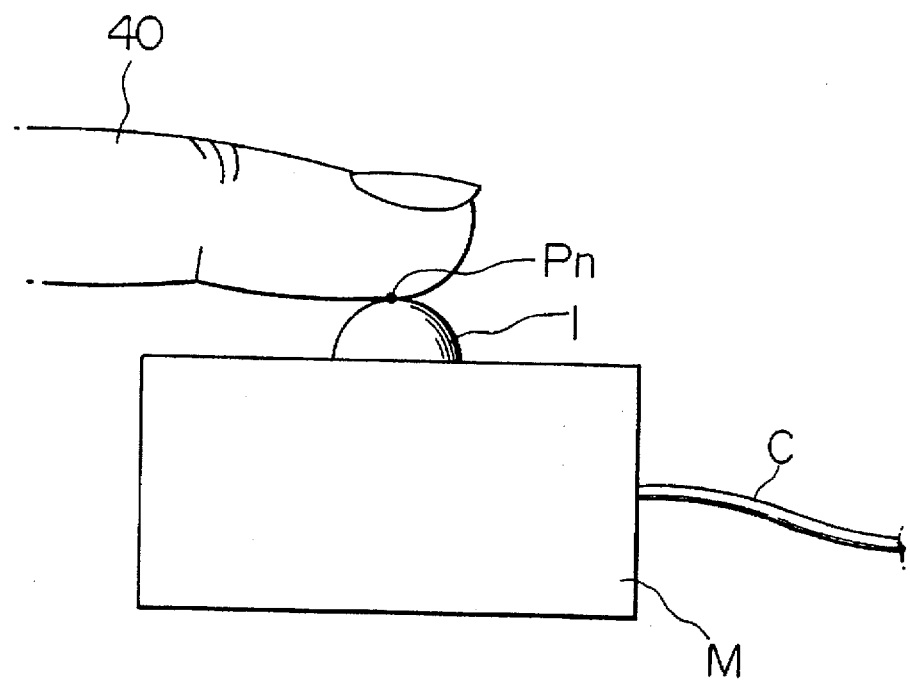
FIG. 6A illustrates a static position of the operation of the position indicator.

Next, the principle of determining the projection coordinates using position sensor 10 will be explained with reference to FIG. 5. FIG. 5 is a simplified version of the position sensor shown in FIG. 3, and the details have been omitted for the purpose of illustrating only the principle of projection coordinates determination. As shown in FIG. 6A, when an user presses on the surface of elastic member 1 with a tip of finger 40, vibrational forces are generated at a point $P_n$ of elastic member 1 due to the effect of arterial blood pressure acting through the finger tip. Point $P_n$ is taken as the effective center point of the generation of these vibrational forces. In other words, point $P_n$ is taken as the center point of application of the pressure point generated by finger 40.

Assuming that vibrations are produced at time t=n, the vibrational forces are propagated as elastic pressure waves through elastic member 1. The pressure waves are attenuated in proportion to a square of the distance traveled, and are detected by elements $S_1 \sim S_4$ which produce corresponding electrical voltages $V_1 \sim V_4$. The equation for the spherical surface of elastic member 1 is given by:

$$x^2 + y^2 + z^2 = r^2 \qquad (1)$$

where z>0.

Therefore, point $P_n$ (x,y) on the spherical surface of elastic member 1 is given from Equation (1) by:

$$P_n [x_n, y_n \{r^2 - (x^2 + y^2)\}^{1/2}] \qquad (2a)$$

$$P_n(x_n, y_n, \sqrt{r^2 - (x_n^2 + y_n^2)}) \qquad (2b)$$

From Equations (1) and (2), the distances between the point $P_n$ and the position indicators $Q_1 \sim Q_4$ are given respectively by the following equations:

$$\overline{P_n Q_1} = \sqrt{a^2 - 2ax_n + r^2} \qquad (3)$$

$$\overline{P_n Q_2} = \sqrt{a^2 - 2ay_n + r^2}$$

$$\overline{P_n Q_3} = \sqrt{a^2 + 2ax_n + r^2}$$

$$\overline{P_n Q_4} = \sqrt{a^2 + 2ay_n + r^2}$$

Because the vibrational intensities decrease in proportion to a square of the propagation distance from the elastic member 1, therefore, the voltages $V_1 \sim V_4$ generated by elements $S_1 \sim S_4$ are inversely proportion to a square of the propagation distance. Voltages $V_1 \sim V_4$ are given by the equality equations as follows:

$$V_1 (\sqrt{a^2 - 2ax_n + r^2})^2 \qquad (4)$$

-continued $$V_2 \left(\sqrt{a^2 - 2ay_n + r^2}\right)^2$$

$$V_3 \left(\sqrt{a^2 + 2ax_n + r^2}\right)^2$$

$$V_4 \left(\sqrt{a^2 + 2ay_n + r^2}\right)^2$$

From Equation (4), the coordinates (x,y) of point $P_n$ (x,y) are given by the following equation:

$$x_n = \frac{(V_1 - V_3) \cdot (a^2 + r^2)}{2a(V_1 + V_3)} \quad (5)$$

$$y_n = \frac{(V_2 - V_4) \cdot (a^2 + r^2)}{2a(V_2 + V_4)}$$

As explained above, when vibrational forces are generated at point $P_n$ on the surface of elastic member 1, the coordinates of point $P_n$ can be determined from the values of output voltages $V_1$~$V_4$ from elements $S_1$~$S_4$. The coordinates of point $P_n$ thus obtained correspond, in effect, to the coordinates of point $P'_n$, shown in FIG. 5, which is a vertical projection of point $P_n$ onto the plane surface L (corresponding to position indicators $Q_1$~$Q_4$ of elements $S_1$~$S_4$).

As shown by Equation (5), the coordinate $x_n$ is calculated from voltages $V_1$ to $V_3$ generated by elements $S_1$ to $S_3$ located on the x axis, independently of the coordinate $y_n$ calculated from voltages $V_2$, $V_4$ generated by elements $S_2$, $S_4$ located on the y axis. The method of computation assures that there will be no mutual interference, which is explained further as follows.

It can be seen by analyzing Equation (4) in detail that only three voltage values from elements $S_1$~$S_4$ are needed to obtain coordinates $x_n$, $y_n$, but with this method, the computation of the last coordinate based on the remaining voltage value is accomplished by the preceding three voltage values. For example, to obtain the coordinates $x_n$, $y_n$ based only on the output voltages from elements $S_1$~$S_4$, the coordinate $x_n$ is calculated first from voltages $V_1$, $V_3$, then substituting this value of $x_n$ in Equation (4), and using the value of voltage $V_2$, the value of $y_n$ can be calculated. But, this method of calculating the coordinate $y_n$ involves voltages $V_1$~$V_3$, and, if there are differences in the output characteristics among the elements, accurate determination of the final coordinate cannot be accomplished.

Figure 14A:
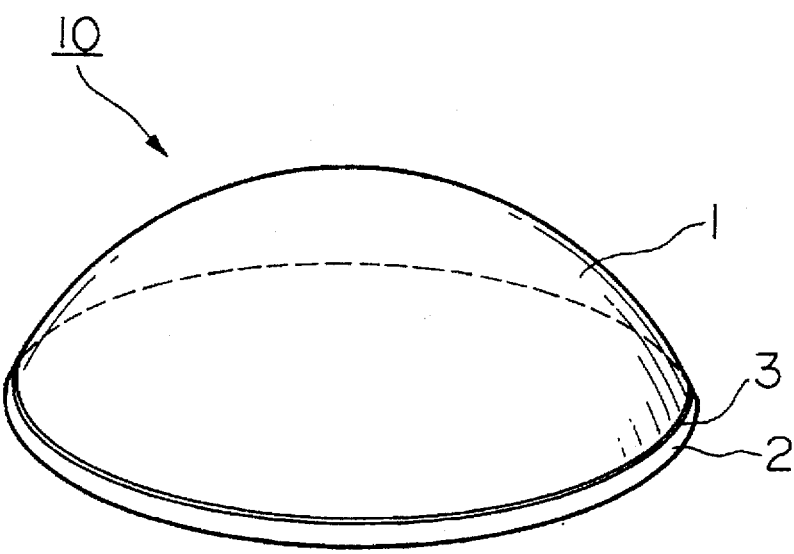
FIG. 14A shows an off-center extended body portion of an elastic member having a low height as a variation of the third embodiment.
Figure 14B:
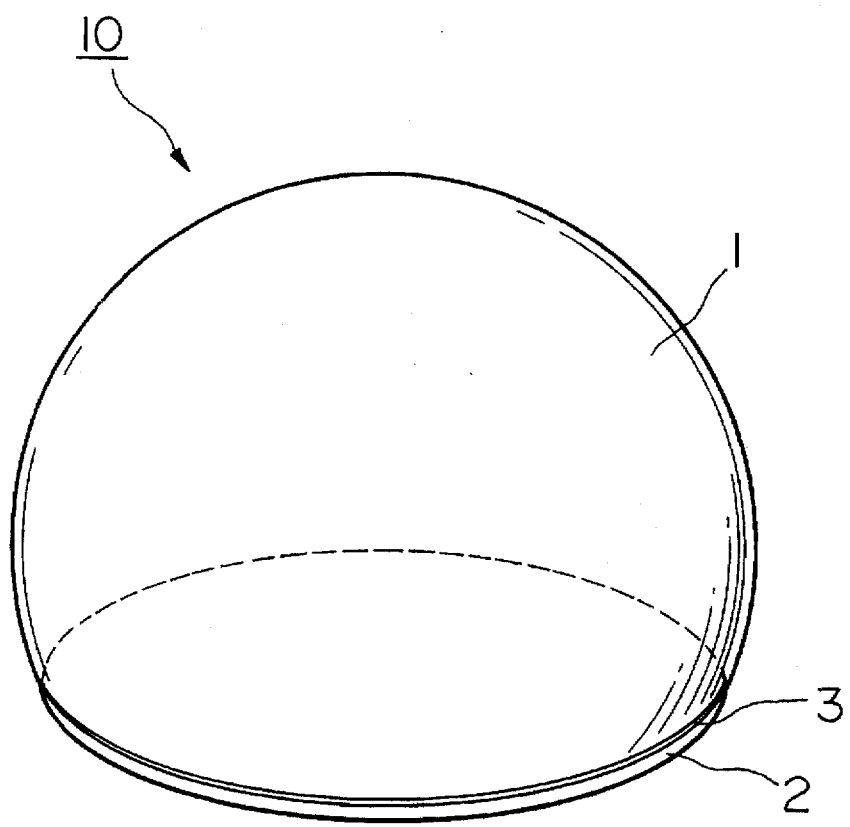
FIG. 14B shows an off-center extended body portion of an elastic member having a high height.

In the above method of coordinates determination process, the roughly semi-spherical elastic member 1 is assumed to be a perfect semi-circular body, i.e., it is assumed that a sphere is sliced exactly in half through its center. However, from the standpoint of the tactile sense of a user, it is better that the elastic member be configured with a low protrusion or convex shape as illustrated in FIG. 14A. Furthermore, it is likely difficult to routinely manufacture a perfectly semi-spherical body, and it is more likely that the actual production product would be more like the configurations shown in FIG. 14A or FIG. 14B, which are exaggerated forms of such off-center elastomeric members. It is possible to obtain the coordinates $x_n$, $y_n$, through Equation (5) by a method of approximation if the deviation from the ideal case, i.e., a perfect semi-spherical body, is within an allowable range. The method of approximation will now be explained. Consider a near semi-spherical elastic member 1 produced by slicing a perfect spherical body off-center by an amount, $\Delta z$. In an elastic body having a radius r, and origin at (0,0), position indicators $Q_1$~$Q_4$ based on elements $S_1$~$S_4$ will be given as:

$Q_1$ (a,0,$\Delta z$)
$Q_2$ (0,a, $\Delta z$)
$Q_3$ (−a,0,$\Delta z$)
$Q_4$ (0,−a, $\Delta z$).

It follows that the square of the distances between $P_n$ and position indicators $Q_1$~$Q_4$ can be obtained from Equation (3), above, resulting in the following equations:

$$\overline{P_nQ_1}^2 = (x_n-a)^2 + y_n^2 + (z_n-\Delta z)^2$$

$$\overline{P_nQ_2}^2 = x_n^2 + (y_n-a)^2 + (z_n-\Delta z)^2$$

$$\overline{P_nQ_3}^2 = (x_n+a)^2 + y_n^2 + (z_n-\Delta z)^2$$

$$\overline{P_nQ_4}^2 = x_n^2 + (y_n+a)^2 + (z_n-\Delta z)^2 \quad (6)$$

where $$z_n = \sqrt{r^2 - (x_n^2 + y_n^2)} \quad . \quad (7)$$

As before, the vibrational forces generated at point $P_n$ are attenuated in proportion to a square of the distances, and voltages $V_1$~$V_4$ will be inversely proportional to the square of the distances between point $P_n$ and the respective position indicators. In other words, a product of the square of a distance given in Equation (6) with the corresponding voltage is equal to that in other position indicators, and, as before, the coordinates $x_n$, $y_n$ of point $P_n$ will be given by the following equations:

$$x_n = \frac{(V_1 - V_3) \cdot (a^2 + r^2 - 2z_n \cdot \Delta z + (\Delta z)^2)}{2a(V_1 + V_3)} \quad (8)$$

$$y_n = \frac{(V_2 - V_4) \cdot (a^2 + r^2 - 2z_n \cdot \Delta z + (\Delta z)^2)}{2a(V_2 + V_4)}$$

In Equation (8), if the value of $\Delta z$ is sufficiently small, the quantity $(\Delta z)^2$ can be disregarded. Also, it can be seen in Equation (8) that if the value of ($z_a \cdot \Delta z$) can be disregarded when the distance between the origin and the position indicators is made as large as possible within the dimension of the radius r. By taking these measures into consideration, Equation (8) becomes virtually the same as Equation (5). In the above method of calculating the coordinates $x_n$, $y_n$, voltage values $V_1$~$V_4$ were used in Equation (5).

An alternative method of computation method involves a calibration experiment to prepare a table relating to a plurality of ratios of output voltages $V_1$~$V_4$ generated by applying vibrational forces of known magnitude on a spot on the exposed surface of elastic member 1. By repeating this process at different points on the exposed surface of elastic member 1, it is possible to complete this table providing relationships of multiple positions on the exposed surface to generated voltages. The actual coordinates ($x_n$, $y_n$) of point $P_n$ can be obtained from the table by finding a ratio of the voltages generated from touching a spot on the exposed surface of elastic member 1.

As seen from the foregoing explanation, it is clear that the shape of elastic member 1 need not be restricted to just a semi-spherical shape. Other surface shapes and configurations suitable to the user can be chosen without invalidating or substantially deviating from the method of calculation of this invention.

I-1-3 Principle of Calculating Components of the Movement Vector

Figure 6B:
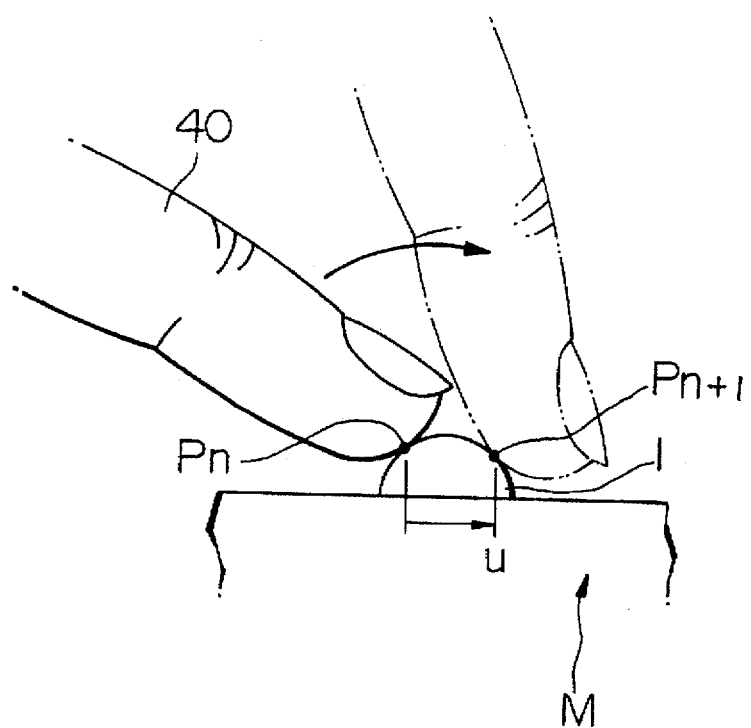
FIG. 6B illustrates a finger movement which defines a movement vector.

With reference to FIG. 6B, the situation for calculation in moving a pressure point to another point on the surface of elastic member 1 will be considered. The finger 40 has moved from a point $P_n$ at time t=0 to another point $P_{n+1}$ at time t=n+1. As in the case before, the coordinates ($x_{n+1}$, $y_{n+1}$) of projected point $P'_{n+1}$ on the plane surface L of pressed point $P_n$ will be obtained. When the pressed point moves from t=n+1 to t=n+2, t=n+3, etc., a similar technique is employed to obtain the respective coordinates of projected points $P'_{n+2}$, $P'_{n+3}$, etc.

By subtracting a preceding coordinate value obtained during a preceding sampling cycle from the current coordinate value, i.e. by obtaining $n_{x+1} - x_n$; and $y_{n+1} - y_n$, it is possible to obtain the x and y components of the movement vector of the pressed point during one sampling cycle. Further, by obtaining the magnitude of the component, i.e., distance of travel, and dividing this value with the duration of the sampling cycle, it is possible to obtain a velocity vector of the movement vector at that point in time. If the frequency of the sampling clock is Fs, the velocity vector V is given by the following expression:

$$V = \frac{\sqrt{(x_{n+1} - x_n)^2 + (y_{n+1} - y_n)^2}}{\frac{1}{Fs}} \quad (9)$$

I-1-4 Clicking Operation

In this embodiment, when an average value of voltages $V_1$~$V_4$ exceeds a specific or predetermined threshold value, the pointing device recognizes this as a "clicking" operation. This situation occurs when finger 40 pressing on a point on elastic element 1 further increases the touching pressure. It can be recognized from Equation (5) that the calculation of the coordinates is performed on the basis of the ratio of voltages $V_1$~$V_4$ rather than their absolute values, and, therefore, the specified coordinates will not be changed unless the touching point is changed.

I-2 Variations of the First Embodiment

I-2-1 First Variation

Figure 7A:
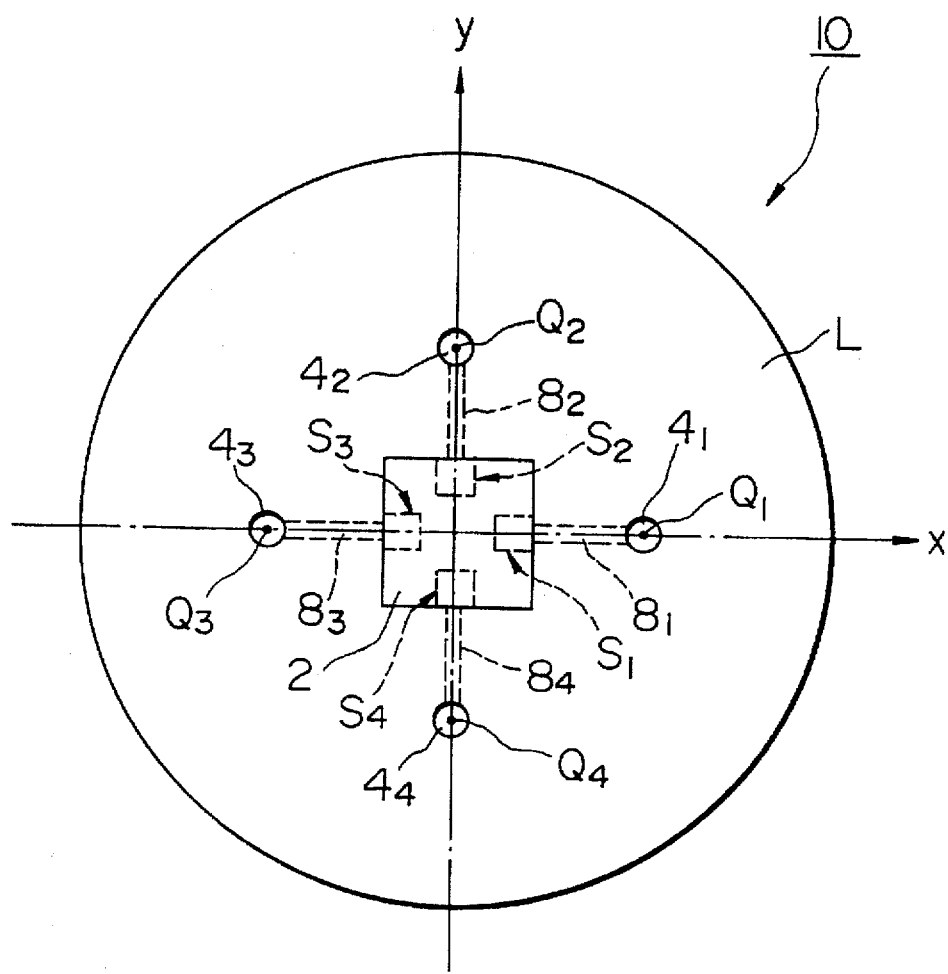
FIG. 7A shows a plan view of the planar bottom section comprising a variation of the first embodiment relative to the position indicators.
Figure 7B:
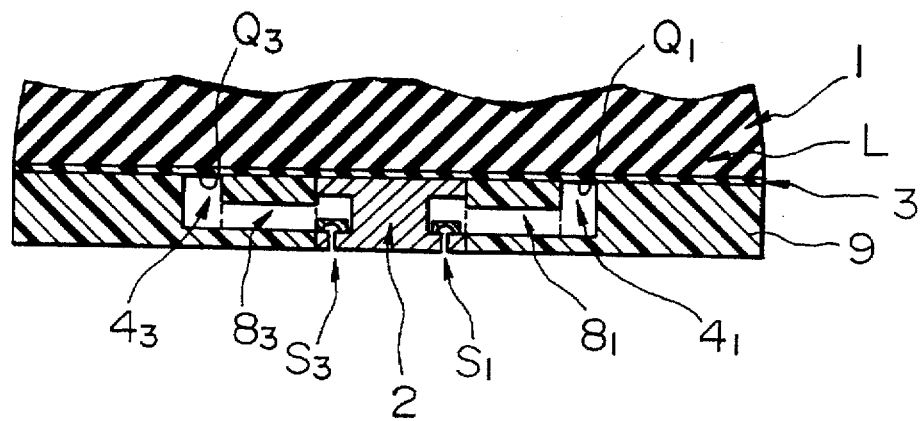
FIG. 7B shows the bonding interface between the elastic member and the semiconductor base section.
Figure 8:
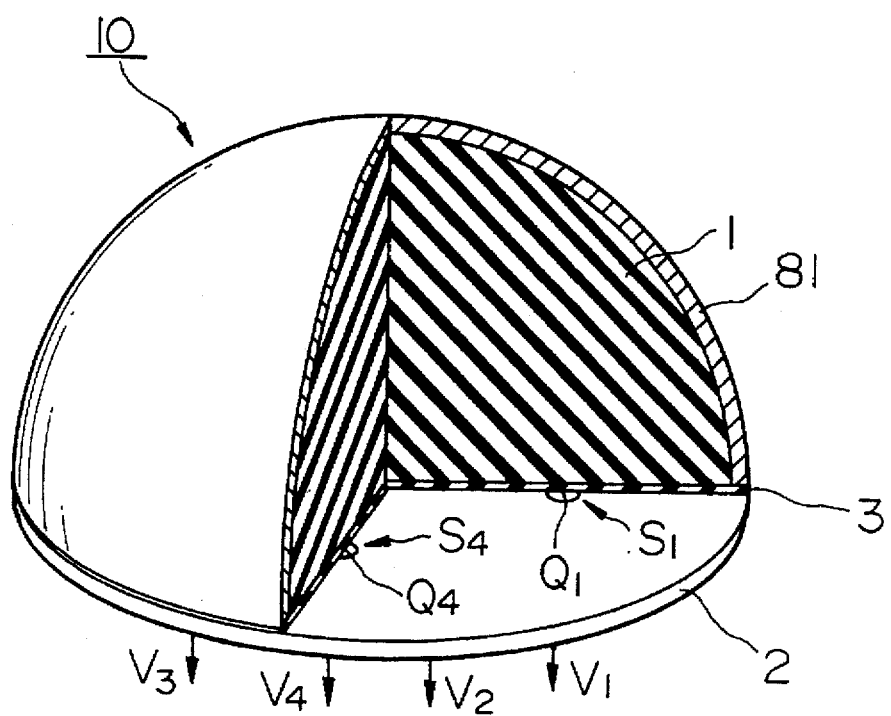
FIG. 8 shows another variation of the first embodiment relative to the position indicator.

A first variation of the first embodiment is shown in FIGS. 7A and 7B. FIG. 7A shows a plan view of another form of position sensor 10. FIG. 7B is a cross sectional view of the location indicator. Those parts which are the same as in the first embodiment will be give the same reference number, and their explanation will be omitted.

As in the case of the first embodiment, position sensor 10 comprises cavity $4_1$ associated with position indicator $Q_1$. Hollow tube or channel $8_1$ is provided on a side surface of cavity $4_1$ and extends towards the center of the plane surface L and joins with base 2. Similarly, cavities $4_1$~$4_4$, associated with position indicators $Q_1$~$Q_4$, are provided to join with base 2 via hollow channels $8_2$~$8_4$ extending toward the center of the plane surface L. Base 2 contains elements $S_1$~$S_4$ which are in communication with channels $8_1$~$8_4$. In this case, cavities $4_1$~$4_4$ and channels $8_1$~$8_4$ are preferably made separately from base 2 and should be made of an elastically rigid material 9, such as hard plastic or metal. This approach is advantageous because elements $S_1$~$S_4$ can be fabricated in groups on base 2, independent of position indicators $Q_1$~$Q_4$, and more effective use of a given base area can be achieved to lower the cost of the device.

In this type of construction, it is acceptable to fill cavities $4_1$~$4_4$ and channels $8_2$~$8_4$ with a liquid or liquid like substances having a low thermal expansion.

As shown in FIG. 7B, position indicator 10 has strain gauges bonded to position indicators $Q_1$~$Q_4$ on the plane surface L to detect the strains produced by the vibrations in member 1. However, this type of construction is susceptible to strains produced by minute deformations affecting the output signals directly when elastic member 1 is pressed with a finger. Therefore, the construction of FIG. 4 is preferred wherein the elastic waves are directly detected via bonding layer 3 and cavities 4.

The number of the elements in this embodiment was four, but the device will perform equally effectively with the use of three elements, as previously indicated. The primary criteria is to ascertain that the positions indicators are provided on the plane bottom section of a semi-spherical elastic member so as to enable the device to accurately correlate the positions of the elements with the positions on the surface of elastic member 1.

According to position sensor 10 in the two embodiments presented above, the elastic waves generated by the vibrations at point $P_n$ are propagated not only to position indicators $Q_1$~$Q_4$ but are propagated uniformly in all directions within elastic member 1. Therefore, there is a disadvantage that the pressure signal strengths represented by voltages $V_1$~$V_4$ at position indicators $Q_1$~$Q_4$ are dependent on the magnitude of the vibrations generated at location $P_n$. Therefore, when the signal strengths are low, the S/N ratio is degraded, i.e., the effect of noise becomes more prominent. In this regard, following embodiments relate to pointing devices having improved S/N ratios.

I-2-2 Other Examples of the Position Sensors

The present inventors discovered that when a cover member 81 (for example a hard plastic or metal) is provided on the surface of elastic member 1 having a higher elastic modulus than that of the elastic member, output voltages $V_1$~$V_4$ from elements $S_1$~$S_4$ are increased over those voltages produced in the case where no such covering is employed. It is believed that this phenomenon is caused by the difficulty of the surface elastic waves to propagate on the surface of the elastic member 1 because of the presence of the covering and, as a result, are more directed toward the center of elastic member 1. Therefore, the magnitude of the output signal from the position indicators are increased by the additional pressures felt at position indicators $Q_1$~$Q_4$, thereby increasing the magnitude of the voltage output $V_1$~$V_4$. In effect, therefore, the propagation coefficient for the elastic waves from the surface of member 1 to the position indictors is improved.

Another advantage of this approach is that the presence of cover member 81 eliminates direct finger contact on elastic member 1, and the deterioration of the material comprising elastic member 1 by finger oil is prevented.

Figure 9:
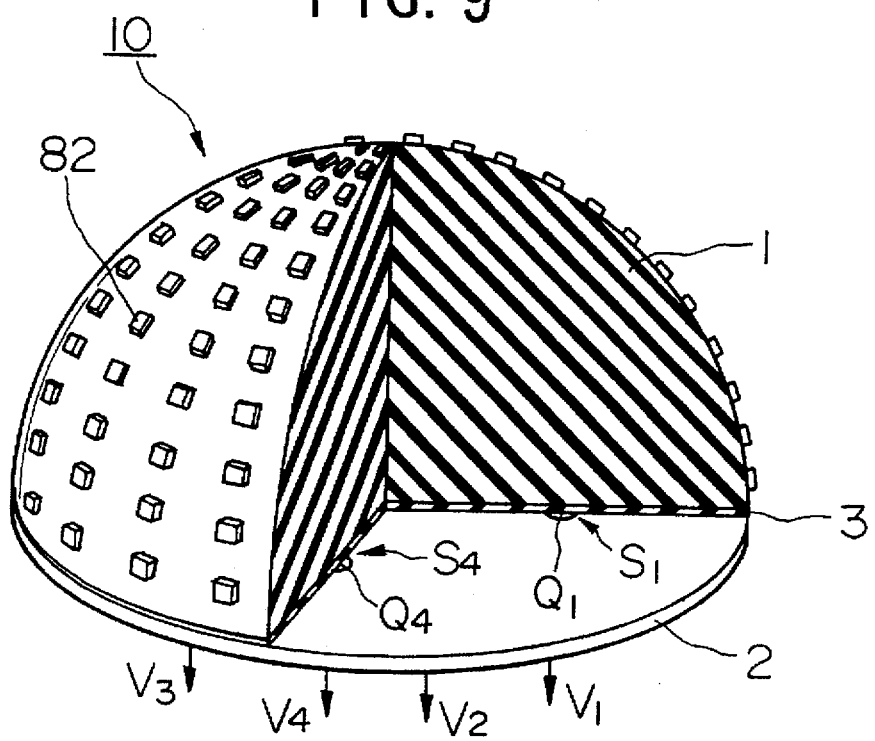
FIG. 9 shows further variation of the first embodiment relative to the position indicator.

As shown in FIG. 9, it is also possible to provide a plurality of small projections 82 over the surface of cover member 81 on the surface of elastic member 1. Projections 82 may be bonded on, embedded in, or made as an integral part of cover member 81. The propagation coefficient is higher for the elastic waves traveling from projections 82 to the position indicators $Q_1$~$Q_4$ than those traveling from the exposed elastic surface of elastic member 1 to position indicators $Q_1$~$Q_4$. Therefore, there is a tendency for the coordinates of point $P_n$ to be selectively defined in favor of those positions of projections 82 as projected on the plane surface L. However, because the output signals are higher, this type of device would be most effective for those applications where resolution is not a prime requirement. However, this situation can be alleviated by increasing the number of projection 82 and their distribution over the surface of elastic member 1.

I-3 Electrical Configuration of the First Embodiment

Figure 2:
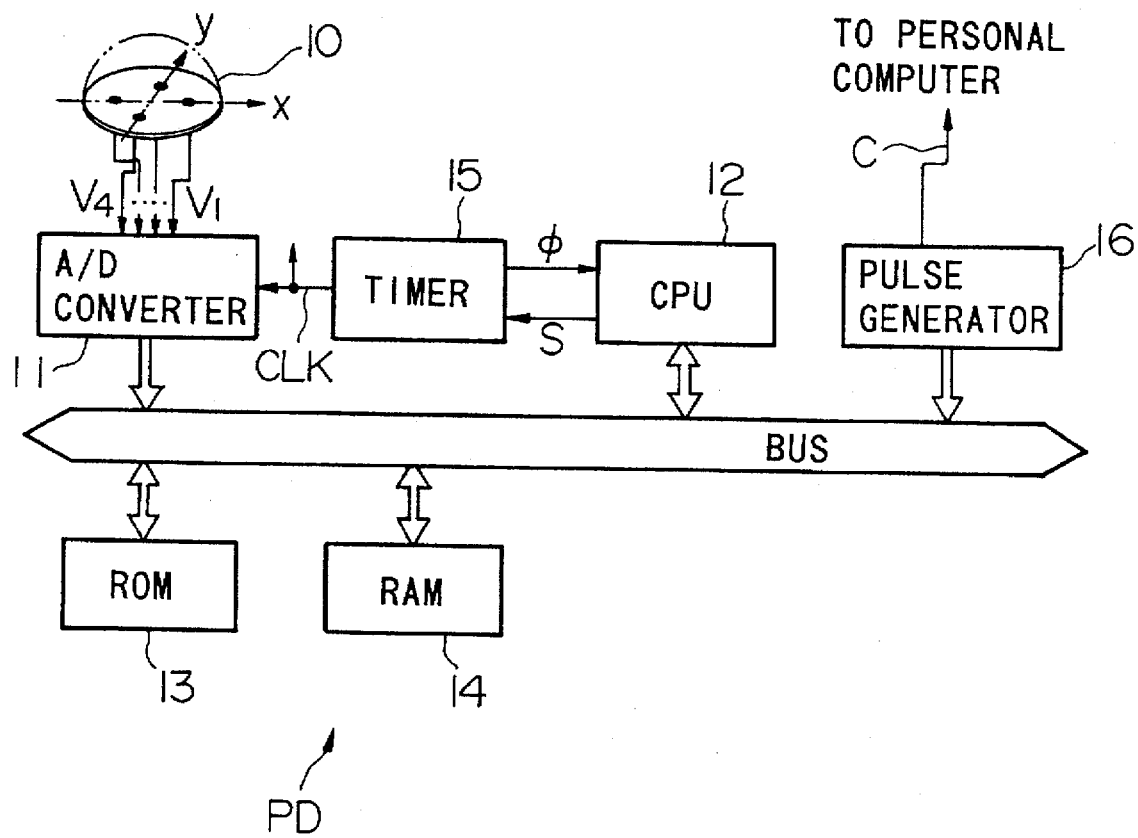
FIG. 2 is a circuit block diagram of the first embodiment.

The electrical configuration of the pointing device of this invention will be explained with reference to FIG. 2. An A/D converter 11 samples output voltages $V_1$~$V_4$ from device 10 at a sample timing determined by the clock CLK, and converts the analog voltage signals to digital signals. In particular, the sampled output voltages $V_1$~$V_4$ are placed in sample hold at the clock rate, and are multiplexed with a multiplexer at a rate significantly faster than the clock rate, and converted into digital signals. Through this arrangement, it is possible to convert output voltages $V_1$~$V_4$ from four elements $S_1$~$S_4$ into digital signals using a single A/D converter 11. The digital signals are supplied via an interface (not shown) and a data bus to CPU 12. ROM stores the programs and other instructions necessary for operation of CPU 12. RAM 14 provides for memory storage of detected coordinates at every clock time. Timer 15 generates the basic clock frequency φ for supplying to CPU 12 as well as providing as output to converter 11 a divided clock frequency, based on the basic clock frequency φ, under the command of control signal S from CPU 12. Pulse generator 16 is generates count pulses corresponding to the movement vector computed by CPU 12 to generate signals to indicate clicking operation, and forwards the generated signals to an external device, such as a PC (not shown), via a chord C (shown in FIG. 1). Pulse generator 16 does not generate count pulses when it is employed as the "absolute coordinate" detection type, and the information on point $P'_n$ is supplied directly to the PC.

CPU 12 computes the coordinates $x_n$, $y_n$ in accordance with Equation (5) from the sampled voltages $V_1$~$V_4$, and, when applicable, subtracts the preceding coordinates $x_{n-1}$, $y_{n-1}$ from the coordinates $x_n$, $y_n$ to obtain the current values for the x and y components for a movement vector during one cycle of the clock CLK. CPU 12 also controls the frequency of the clock CLK of timer 15 by means of the control signal S so that the frequency is reduced to a half, for example, when the movement velocity of device 10 is faster than a specific value, or to double the frequency, for example, when the movement velocity is slower than the specific value. Other operations of CPU 12 will be explained later.

I-4. Operations of the First Embodiment

The operations of pointing device PD of the first embodiment will now be explained. There are following two ways in which the point device PD is used:

(1) Absolute Coordinate Detection Type; and
(2) Relative Coordinate Detection Type.

The selection between the two detection types can be achieved by a switch or an external command.

(1) Absolute Coordinate Detection Type

This detection type is employed to define a static point. It is assumed here that the screen coordinates on the PC screen and the coordinates on the plane surface L of the PD device have been correlated on a one to one basis when the pointing device PD is used as an absolute type. The user places finger 40 on the surface of elastic member 1, as illustrated in FIG. 6, and presses on its surface. The center of the pressed point is defined in terms of a vertical projection point of the pressed point on the plane surface L. The pressing operation causes elastic member 1 to vibrate at the pressed point as the center of vibration, and the generated elastic waves are propagated toward position indicators $Q_1$~$Q_4$. The elastic waves are detected by elements $S_1$~$S_4$ and are converted into voltages $V_1$~$V_4$ and thereafter digitized. The coordinates $x_n$, $y_n$ are calculated on the basis of the digitized data by CPU 12, and are forwarded to a connected PC. This operation is repeated for every clock cycle of clock CLK, and successive coordinates are determined. Thus, in the absolute coordinate detection type, for every clock cycle or period, the coordinates $x_n$, $y_n$ are generated by position indicator $Q_1$~$Q_4$ on the basis of the point on the plane surface L projected by the pressed point on elastic member 1. The results are then provided to the PC to specify a point for the screen coordinates of the PC display.

In the absolute detection type, when the user does not press on elastic member 1, the elastic waves are not generated and voltage values $V_1$~$V_4$ of elements $S_1$~$S_4$ are all equal to one another. As can be seen from Equation (5), under this condition, the coordinates become (0,0), and the cursor mark is returned to its origin on the display.

(2) Relative Coordinate Detection Type

Figure 10:
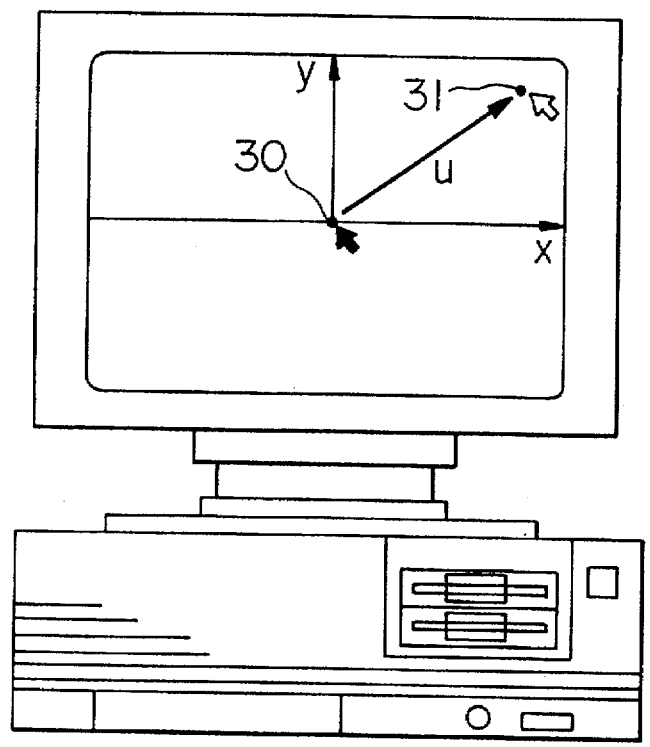
FIG. 10 is a front view of a computer for illustrating cursor movement on a display screen in terms of the x and y components of a movement vector, u.

This detection type is employed to define a moving point. With reference to FIG. 10, the initial assumption is made that the initial coordinate position for cursor mark 30 of a PC at time, t=0, is at the center of a screen. Let us assume that the user wishes to achieve a new cursor position 31 which is located in a right upper corner of the screen. In this case, "u" designates a vector joining the present cursor position with a desired new position. Incidentally, in PC screens, the usual positive direction for the y axis is down or South direction, but to match the coordinate directions with position indicator 10 of the plane surface L for simplification of this explanation, the up or North direction will be considered as the positive direction. To move cursor mark 30 to the new position, the user moves finger 40 on member 1 as illustrated in FIG. 6B, i.e., the user presses on a point with finger 40 (step 1), and moves finger 40 along the surface in the direction of vector u (step 2). While watching the PC screen, the user repeats the steps 1, 2 so as to obtain coincidence between current cursor mark position 30 with the desired position 31. This operation performs an action similar to rotation of elastic member 1 in the direction of vector u. Of course, however, elastic member 1 does not actually rotate. The foregoing operative steps will be explained in terms of the device components as presented in the embodiments.

Step 1

At time t=n, when the user presses on elastic member 1, elastic vibrations are propagated from the pressed point as the vibration center, as in the case of the absolute type. The elastic waves are detected by elements $S_1$~$S_4$, and CPU 12 computes the coordinates $x_n$, $y_n$ of the projected position corresponding to the pressed point on the plane surface L. The calculated coordinates are temporarily placed in memory in RAM 14.

Step 2

When one clock cycle is completed, (when t=n+1), coordinates $x_{n+1}$, $y_{n+1}$ are similarly computed, and stored in RAM 14 while the coordinates from the previous cycle, $x_n$, $y_n$ are read from RAM 14. Then, a difference in value is obtained from, $$x_{n+1} - x_n$$
$$y_{n+1} - y_n$$

in order to obtain x components and y components of the movement vectors during one clock cycle. The movement vectors are supplied to pulse generator 16. In pulse generator 16, count pulses and the directional marks corresponding to each movement vector are generated, and are forwarded to the PC. The count pulses indicate the absolute value of the vector, and the marks indicate the direction of the vector to define the magnitude and the direction of the movement needed for the coordinates, $x_n$, $y_n$. The result is that the cursor mark 30 moves by the amount specified by the movement vectors from the preceding position and arrives at the first new position. Similarly, at time t=n+2; the second new coordinates, $$x_{n+2} - x_{n+1}$$

$$y_{n+2} - y_{n+1}$$

are calculated. The count pulses and directional marks are generated to correspond with the second new position, and are forwarded to the PC. As a result, is cursor mark 30 moves from the first new position to the second new position by the amount and the direction specified by the second movement vectors.

Similar computations are carried out for any number of moves of the pressed point at times, t=n+i, where i=1, 2, 3 ..., to calculate the respective movement vectors from the coordinates:

$$x_{n+i} - x_{n+i-1}$$

$$y_{n+i} - y_{n+i-1}$$

and the corresponding pulse counts and directional marks are generated and provided to the PC, thereby achieving successive movements of the cursor mark 30 specified by the number of pressed points on pointing device PD.

In summary, therefore, the user moves the pressed point on elastic member 1 so that cursor mark 30 on the screen moves from one screen position to a desired screen position through repeated operation of a pressed point on elastic member 1 thereby generating a number of appropriate movement vectors u to reach the desired coordinate position on the screen.

CPU 12 further controls the frequency division of the clock CLK in timer 15, by generating a control signal S in accordance with the velocity V of the movement vector u obtained from Equation (9). In particular, the velocity V is divided into three ranges such that:

$$0 \leq V < V_{min} \quad (\alpha)$$

$$V_{min} \leq V < V_{max} \quad (\beta)$$

$$V_{max} \leq V \quad (\gamma)$$

where V represents the current velocity and $V_{min}$, $V_{max}$ represent predetermined threshold velocity values. In relation to the three speed ranges, CPU 12 determines in which speed range the current speed is operating, and generates the control signal S to control the clock rate of timer 15. For example, if the current velocity is in the ($\alpha$) range, the present clock cycle is doubled; if the velocity is in the ($\beta$) range, the present clock cycle is retained; and if the velocity range is in the ($\gamma$) range, the clock cycle is halved. Various control techniques are used as required. This method of controlling the sampling rate is used to enable following the movement of the pressed point in these embodiments. In the relative detector type, when the user does not press on elastic member 1, the movement vector, u, is zero, and cursor mark 30 is maintained in its current position. In this case, since the velocity is zero, the sampling period of the clock CLK becomes longer.

(II) SECOND EMBODIMENT

Figure 11:
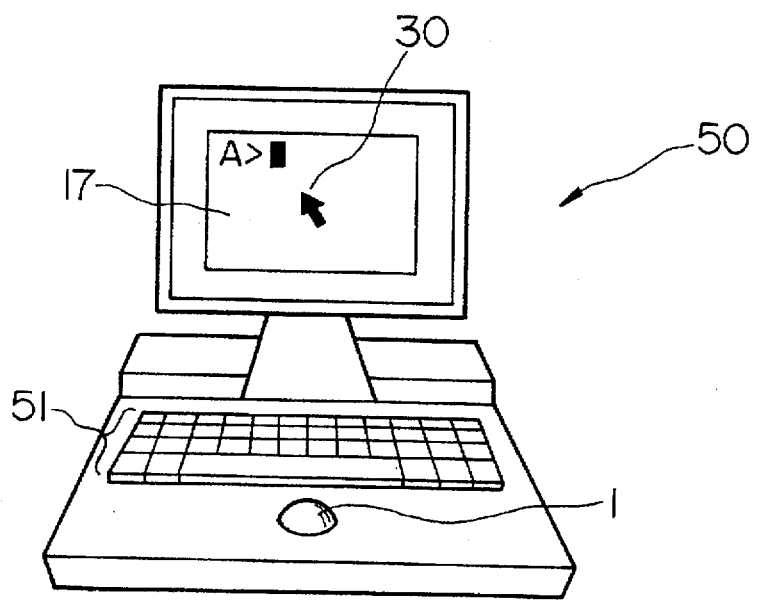
FIG. 11 illustrates a second embodiment of a pointing device of this invention.

In the first embodiment, pointing device PD was made to be a stand alone device for use, for example, with a desktop type PC. The second embodiment provides the application for pointing device PD provided within the body PC apparatus. FIG. 11 shows a perspective view of the second embodiment of the pointing device PD of this invention. The pointing device PD is incorporated in laptop PC 50 having display section 17. Cursor mark 30 is shown in display section 17, and the input of data into PC 50 is provided through keyboard 51. In this example, elastic member 1 is supported so as to protrude from the horizontal front section adjacent to keyboard 51.

Figure 12:
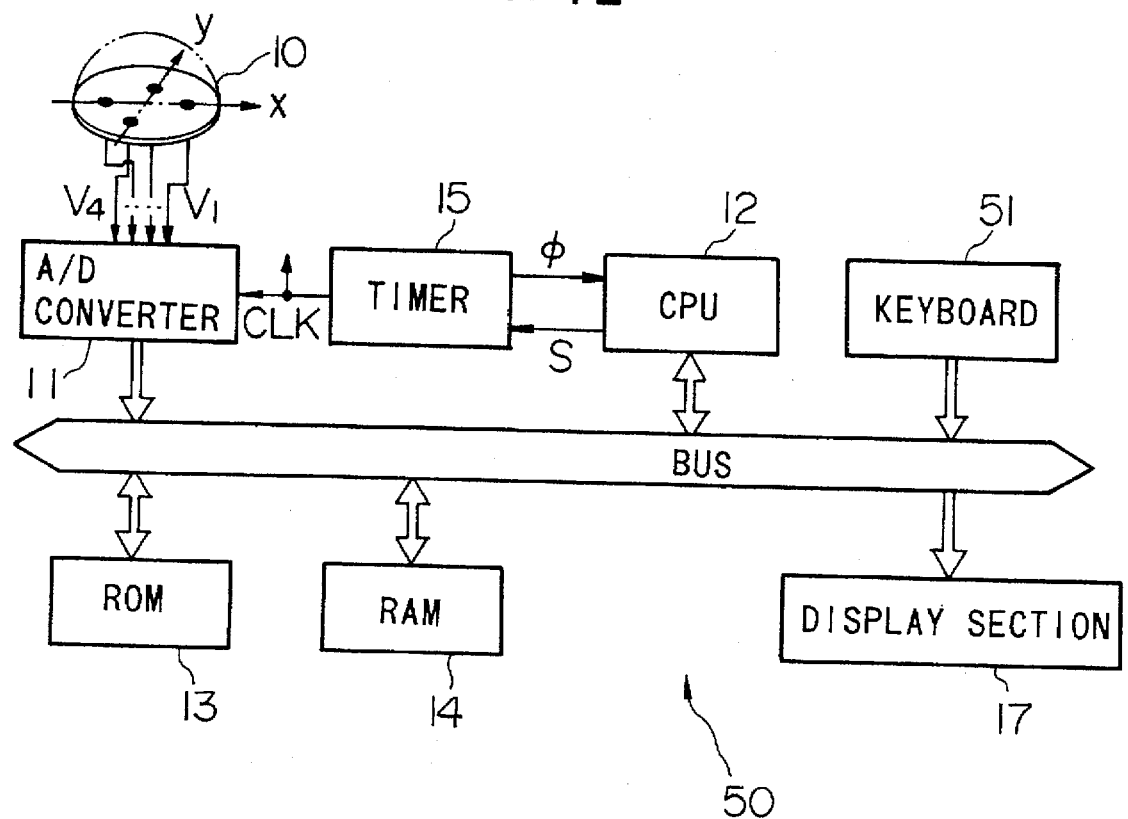
FIG. 12 is a circuit block diagram of the second embodiment.

FIG. 12 shows a block circuit diagram for the second embodiment. The difference in the circuit configuration between the first embodiment shown in FIG. 2 and the second embodiment shown in FIG. 12 is that pulse generator 16 is not required because its function can be provided by PC 50. CPU 12, ROM 13 and RAM 14 shown in FIG. 12 are shared with PC 50, i.e., PC 50 performs computations related to defining the coordinates in the first embodiment or the movement vector, u, in addition to the standard computational requirements of PC 50, thereby specifying positions for cursor mark 30.

(III) THIRD EMBODIMENT

Figure 13:
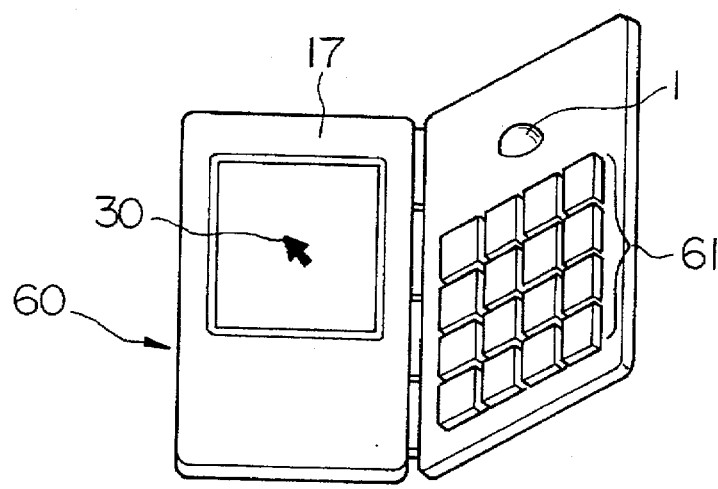
FIG. 13 is a perspective view of a third embodiment of a pointing device of this invention.

A third embodiment of the pointing device PD will be explained with reference to FIG. 13 which is a perspective view of the external appearance of a portable electronic device, such as a personal data assistant (PDA), according to the third embodiment. The pointing device PD is incorporated into the portable electronic device having display screen 17, such as electronic memo 60. In this case, the elastic member 1 is provided in the upper section of key switch assembly 61. The electrical configuration of this embodiment is the same as that shown in FIG. 12.

The point devices of the second and third embodiments have the advantage that miniaturization of the pointing device PD can be achieved by eliminating the necessity for a moving part, such as a rotatable sphere.

(IV) FOURTH EMBODIMENT

Figure 15:
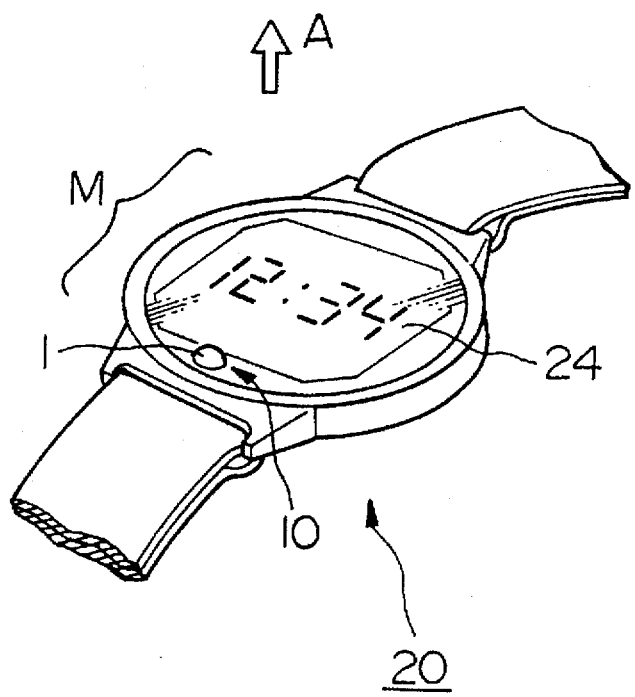
FIG. 15 illustrates a fourth embodiment of a pointing device incorporated into a wrist watch.
Figure 16:
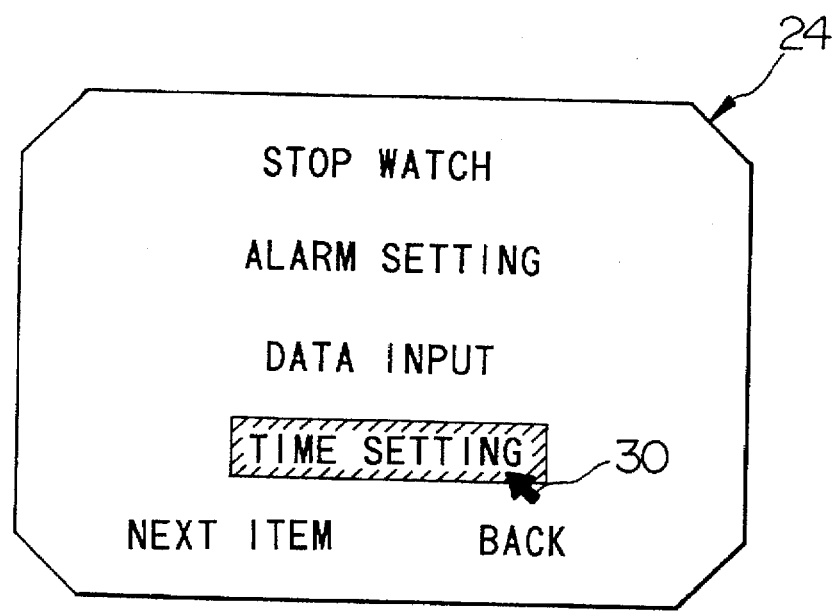
FIG. 16 is an illustration of an exemplary LCD menu display for the wrist watch of FIG. 15.
Figure 17:
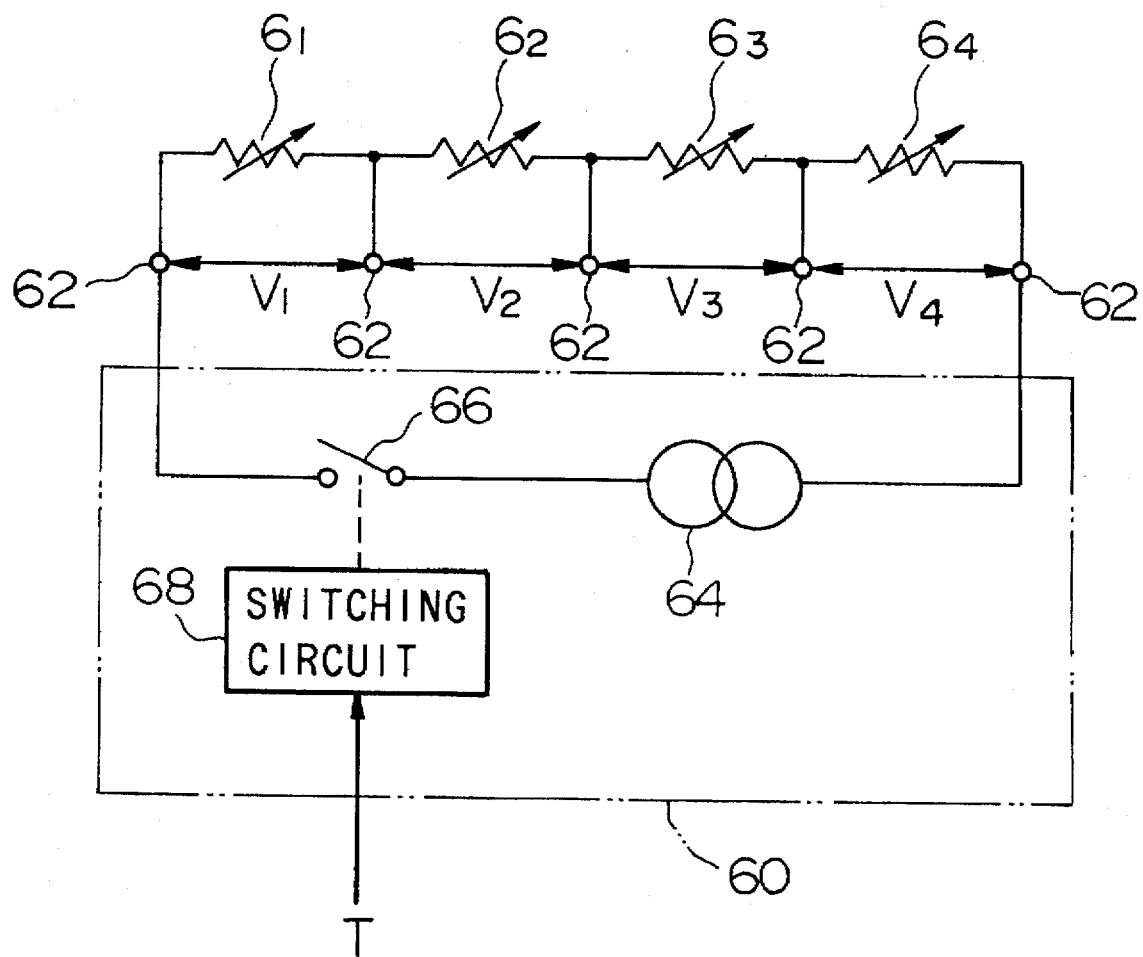
FIG. 17 is a circuit block diagram for biasing the pressure sensing elements in the fourth embodiment.

In a fourth embodiment of the pointing device PD, shown in FIGS. 15–17, the pointing device is applied to wrist watch 20 in FIG. 15 having a size even smaller than that utilized in the previous embodiments.

IV-1 Construction of the Wrist Watch

In FIG. 15, wrist watch 20 has liquid crystal display (LCD) panel 24 which is disposed in the middle of watch casing M. Panel 20 is viewed in the direction A and normally displays time of the day, but can also display a menu for selecting a function. An example of such a menu is shown in FIG. 16. The functions shown in this menu are listed in rows, and for any one function, subsequent information are stored in layers below the first layer. A desired function can be selected by means of cursor mark 30 and a clicking operation brings forth the selected information in rotation or round robin fashion.

IV-2 Electrical Configuration of Position Sensor

FIG. 15 shows an elastic member 1 which comprises a portion of position indicator 10 disposed below the surface of panel 24. The screen coordinates are specified by pressing and clicking operations on elastic member 1 in manner as explained in the previous embodiment. When a finger presses on a point on elastic element 1 with further increase in the touching pressure, a clicking operation is performed. When an average value of voltages $V_1$~$V_4$ exceeds a specific or predetermined threshold value, the pointing device recognizes this as a "clicking" operation.

The electrical configuration of the elements $S_1$~$S_4$ of position indicator 10 will be explained with reference to FIGS. 17 and 18. Strain gauges $6_1$–$6_4$, which correspond with the elements $S_1$~$S_4$, are connected in series and function as variable resistors to achieve balancing of the circuit. Output terminals 62 are provided across each of the gauges and the end output terminals of the series are connected to biasing circuit 60. Biasing circuit 60 comprises constant current circuit 64; switch 66 for turning an output signal from circuit 64 on and off; and switching circuit 68 for turning switch 66 on when a control signal T becomes high or H. In other words, the output signal from fixed current circuit 64 is impressed on the strain gauges $6_1$–$6_4$ when control signal T becomes high H.

As described previously, the resistance of a strain gauge varies with changes in strains and, therefore, when a constant current is flowing through strain gauges $6_1$–$6_4$, voltages $V_1$~$V_4$ between terminals 62 are proportional to the pressures existing at position indicators $Q_1$~$Q_4$ and will represent the relative magnitude of the applied pressures.

Figure 18A:
FIG. 18A is an exemplary waveform of applying a constant biasing.
Figure 18B:
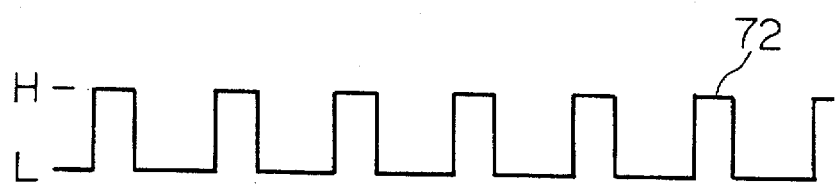
FIG. 18B is an exemplary waveform of periodic application of biasing.
Figure 18C:
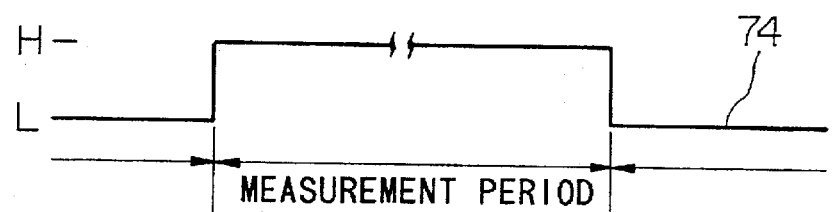
FIG. 18C is an exemplary waveform of continuous application of biasing during a measuring period.
Figure 18D:
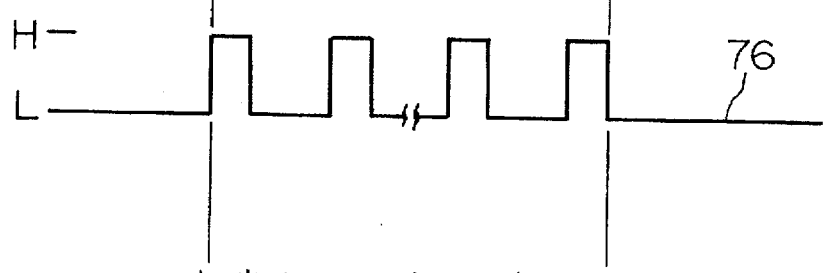
FIG. 18D is an exemplary waveform of periodic application of biasing during a measuring period.

There are varieties of waveforms which may be employed for control signal T, depending on the scale and the construction of a device to process output signals from position indicator 10. Some examples are illustrated in FIGS. 18A–18D. FIG. 18A shows a constant signal 70 showing a high, H, during both the measurement and non-measurement period; FIG. 18B shows pulse signal 72 during both the measurement and non-measurement period; FIG. 18C shows signal 72, which is a constant high, H, during the measurement period; and FIG. 18D shows pulse signal 76 which becomes high only during the measurement period. In the case here, the measurement period refers to a period during the detection of the elastic vibrations.

In considering the suitability in selecting a signal T, signal 70 is suitable for high accuracy of position detection. On the other hand, if low power consumption is important, then pulse signal 76 would be more suitable. For reasonable accuracy and power conservation, signals 72 or 74 would be more suitable. Matters relating to this suitability will be explained in more detail later.

Strain gauges $6_1$–$6_4$ receive a constant flow of current, and there is some heat generation. Therefore, a temperature differential is created between times when biasing is applied and when biasing is not applied. The temperature difference leads to a slight difference in the resistance values and can cause an error in actual pressure determinations. If signal 70 is chosen for control signal T, current is flowing through strain gauges $6_1$–$6_4$ even during the non-measurement periods. If measurements are made allowing for a period of time to elapse for thermal stabilization of the circuit, measurement errors stemming from temperature differences will be extremely low. If signal 76 is chosen for control signal T, the current flows intermittently only during the measurement period, and the thermal generation effect is minimized and power conservation can also be achieved. Further, power conservation would be possible by operating position indicator 10 and its associated circuitry, i.e., A/D converter, amplifiers etc., synchronously with the measurement operation. Moreover, timing arrangements can be made so that power is applied to the measuring circuit only when pulse signal 76 is high or H for further savings in power consumption.

Figure 18E:
FIG. 18E is an exemplary waveform of a continual application of bias current pulses.
Figure 18F:
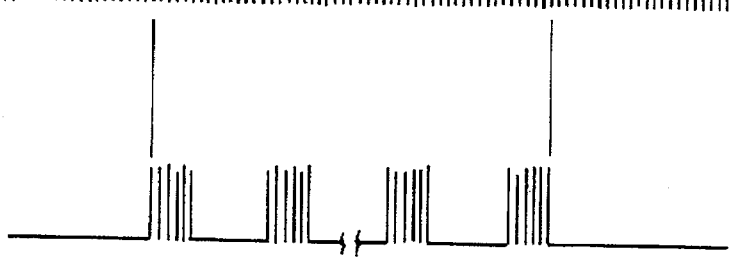
FIG. 18F is an exemplary waveform of a periodic application of bias current pulses.

The constant biasing current from constant current output circuit 64 can have various waveforms. For example, the signals may be provided have to sufficiently higher frequencies than indicated by either pulse signals 72 or 76, as illustrated in FIG. 18E. Of course, various combinations of signals 70, 72 and 76 may be chosen. In particular, if pulse signal 76 is chosen, the period of application of the biasing voltage on stain gauges $6_1$–$6_4$ will be a very short period so that the power consumption will be very low. Position indicator 10 and its associated measuring circuits may be operated synchronously with the application of the biasing voltage for power conservation, and only during the period of the application of bias voltage.

It should be noted that the spacing of the bias peaks should be compatible with the Sampling Theorem and, also, the central processor is capable of handling the output data.

IV-3 Electrical Configuration for the Wrist Watch

Figure 19:
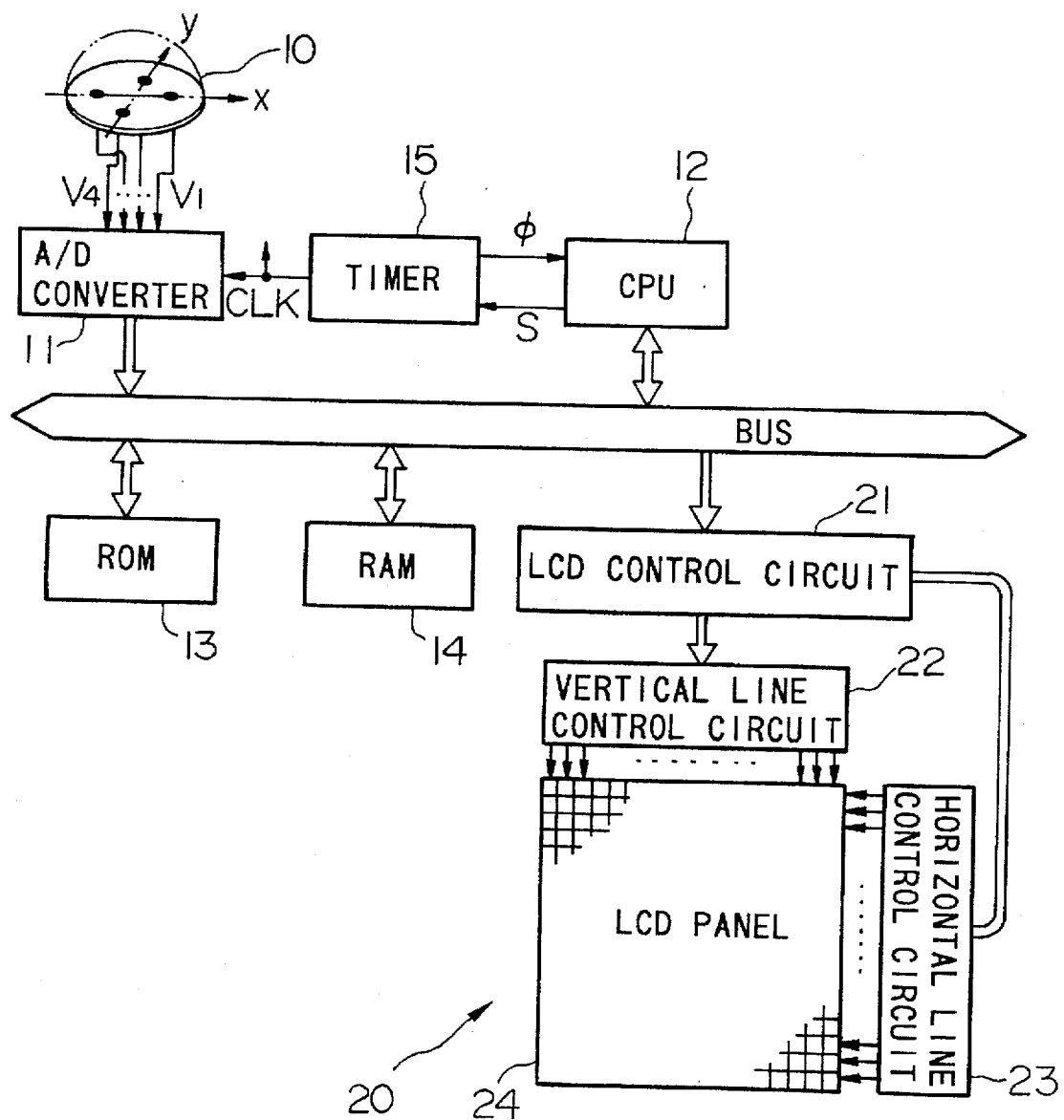
FIG. 19 is a circuit block diagram in the fourth embodiment of the pointing device applicable to a wrist watch.

FIG. 19 shows an electrical circuit configuration for wrist watch 20. Compared with the circuit shown in FIG. 12, the watch circuit has no keyboard 51, and LCD panel 24 is employed instead of display section 17. The control signal T for the biasing circuit 60 shown in FIG. 17 is generated by a clock CLK. Therefore, in biasing circuit 60 of this embodiment, the biasing voltage is applied to strain gauges $6_1$–$6_4$ synchronously with the clock CLK signals.

In FIG. 19, LCD control circuit 21 generates timing signals and display data to be displayed on LCD display panel 24 based on the data supplied via data bus from CPU 12. Circuit 21 supplies this data to vertical line control circuit 22 and horizontal line control circuit 23 to LCD panel 24. Vertical line control circuit 22 and horizontal line control circuit 23 are connected to each electrode of panel 24, and control the respective vertical or horizontal electrodes of the panel. Data supplied by CPU 12 is, therefore, displayed on LCD panel 24.

IV-4 Operation of the Wrist Watch

The operation of wrist watch 20 is as follows. When a watch display function is selected, the basic clock φ is counted by CPU 12, and the accumulated count is displayed on panel 24 as the time of the day, which is conventional.

When position indicator 10 is clicked while the time of the day is being displayed, the cursor mark (not shown) is displayed in the center of panel 24 and at the same time, the display changes to a menu, illustrated in FIG. 16. At this time, the cursor mark is moved to a desired function according to a predetermined absolute mode or a standard mode. The selected function is operated with the use of position indicator 10. It can be seen in this embodiment that the position indicator 10 is capable of performing all the operations required of any electronic devices regardless of the size or the complexity of the implemented functions.

As a final note, a method is described for increasing the accuracy of position determination by correcting the differences in the performance of individual element $S_1$~$S_4$ due to their individual operational differences in physical characteristics. The technique is based on determining a position with different groups of three of the four elements. First, three elements are selected from the four elements, and coordinates $x_n$, $y_n$ are determined for a screen position. Next, another three elements are chosen to obtain the same coordinates $x_n$, $y_n$. The number of ways of selecting three elements from four elements is a total of four given by the representation, $_4C_3$. The remaining two ways will also produce two sets of coordinates $x_n$, $y_n$. The four sets of coordinates thus obtained independently will all be the same if all elements $S_4$–$S_4$ have the same characteristics. If there is a disagreement, it can be considered that the output characteristics of the elements are different, and reverse computations can be carried out by adjusting the output voltages to obtain equal output values from all four elements $S_1$–$S_4$. By this technique, the individual performance differences among the four elements can be corrected to achieve a more accurate position determination.

The above embodiments are meant to be illustrative and not intended to restrict the application of the pointing device. It should be understood that the principle of determining projection coordinates outlined can be applied to other forms of non-rotating position determining type devices. For example, there will be many variations in the arrangement and/or number of the pressure sensing members utilized, as well as in the choice of the fabrication methods and the physical configuration of the elastic member. Thus, while this invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations that may fall within the spirit and scope of the appended claims.

What is claimed is:

1. An electronic pointing device for determining a static position on a viewing screen of a computing device, the point device comprising:

an elastic member having an extended upper body portion and a planar bottom surface bonded to a base section, said elastic member for propagating vibrational pressure waves generated from a pressed point on said body portion, said vibrational pressure waves attenuating as they propagate across said elastic member;

at least three pressure sensing means disposed in said base section for detecting vibrational pressure waves propagated from said pressed point and providing position indicating signals in correspondence with attenuated results of said detected vibrational pressure waves; and first computing means for computing projected coordinates of said pressed point in accordance with said position indicating signals for defining orthogonal coordinates of said pressed point relative to a reference point of said planar bottom section.

2. The electronic pointing device of claim 1 wherein said first computing device computes said projected coordinates at specified time intervals.

3. An electronic pointing device for determining a moving position on a viewing screen of a computing device, the device comprising:

an elastic member having an extended upper body portion and a planar bottom surface bonded to a base section, said elastic member for propagating vibrational pressure waves generated from a pressed point on said body portion, said vibrational pressure waves attenuating as they propagate across said elastic member;

at least three pressure sensing means disposed in said base section for detecting vibrational pressure waves propagated from said pressed point and providing position indicating signals in correspondence with attenuated results of said detected vibrational pressure waves;

first computing means for computing projected coordinates of said pressed point in accordance with said position indicating signals for defining orthogonal coordinates of said pressed point relative to a reference point of said planar bottom section; and second computing means for computing said position indicating signals at specified time intervals and computing a movement vector for indicating a positional change of said pressed point from a previously pressed point in a predetermined time interval.

4. The electronic pointing device of claim 3 wherein said second computing means further comprises time interval control means for adjusting said time interval in accordance with a velocity of movement in said pressed point.

5. The electronic pointing device of claim 1 wherein said base section is bonded to said elastic member via an adhesive bonding.

6. The electronic pointing device of claim 1 wherein said at least three pressure sensing means comprise four pressure sensing means disposed equidistantly from a center point of said base section in orthogonal symmetry.

7. An electronic pointing device for determining a static position on a viewing screen of a computing device, the pointing device comprising:

an elastic member having an extended upper body portion and a planar bottom surface bonded to a base section, said elastic member for propagating vibrational pressure waves generated from a pressed point on said body portion, said vibrational pressure waves attenuating as they propagate across said elastic member;

four pressure sensing means disposed within said base section equidisitantly from a center point thereof in orthogonal symmetry, said pressure sensing means configured for detecting vibrational pressure waves propagated from said pressed point and providing position indicating signals in correspondence with attenuated result of said detected vibrational pressure waves; and first computing means for computing projected coordinates of said pressed point in accordance with said position indicating signals for defining orthogonal coordinates of said pressed point relative to a reference point of said planar bottom section;

wherein said four pressure sensing means are fabricated on a common semiconductor base section.

8. The electronic pointing device of claim 7 wherein said base section includes at least one cavity having an opening through a bottom surface of said base section, and each of said pressure sensing means is disposed in said cavity for detecting pressure changes within each said cavity.

9. The electronic pointing device of claim 8, wherein said cavity is filled with a liquid like medium.

10. The electronic pointing device of claim 7 wherein said base section comprises at least three cavities, each having an opening through said bottom surface, and a respective pressure transmission means for transmitting pressure variations in said cavity so as to enable each pressure sensing means to detect an internal pressure change in each of said respective pressure transmission means.

11. The electronic pointing device of claim 10 wherein said at least three cavities and said respective pressure transmission means are filled with liquid like medium.

12. The electronic pointing device of claim 10 wherein said pressure transmission means are comprise an elastically rigid material.

13. An electronic pointing device for determining a static position on a viewing screen of a computing device, the pointing device comprising:

an elastic member having an extended upper body portion and a planar bottom surface bonded to a base section, said elastic member for propagating vibrational pressure waves generated from a pressed point on said body portion;

at least three pressure sensing means disposed in said base section for detecting vibrational pressure waves propagated from said pressed point and providing position indicating signals in correspondence with said detected vibrational pressure waves; and first computing means for computing projected coordinates of said pressed point in accordance with said position indicating signals for defining orthogonal coordinates of said pressed point relative to a reference point of said planar bottom section;

wherein said extended upper body portion of said elastic member is covered with a material having a higher modulus of elasticity than a modulus of elasticity of said elastic member.

14. An electronic pointing device for determining a static position on a viewing screen of a computing device, the pointing device comprising:

an elastic member having an extended upper body portion and a planar bottom surface bonded to a base section, said elastic member for propagating vibrational pressure waves generated from a pressed point on said body portion;

at least three pressure sensing means disposed in said base section for detecting vibrational pressure waves propagated from said pressed point and providing position indicating signals in correspondence with said detected vibrational pressure waves; and first computing means for computing projected coordinates of said pressed point in accordance with said position indicating signals for defining orthogonal coordinates of said pressed point relative to a reference point of said planar bottom section;

wherein said extended upper body of said elastic member is covered with a plurality of projections having a higher modulus of elasticity than a modulus of elasticity of said elastic member.

15. An electronic pointing device for determining a static position on a viewing screen of a computing device, the pointing device comprising:

an elastic member having an extended upper body portion and a planar bottom surface bonded to a base section, said elastic member for propagating vibrational pressure waves generated from a pressed point on said body portion;

at least three pressure sensing means disposed in said base section for detecting vibrational pressure waves propagated from said pressed point and providing position indicating signals in correspondence with said detected vibrational pressure waves; and first computing means for computing projected coordinates of said pressed point in accordance with said position indicating signals for defining orthogonal coordinates of said pressed point relative to a reference point of said planar bottom section;

wherein said elastic member is disposed on a hand-held casing so as to expose said extended upper body portion on a control surface.

16. The electronic pointing device of claim 1 wherein said electronic pointing device is incorporated in a electronic apparatus having a plurality of functions for performing computational tasks and for displaying computed results on a display screen of said electronic apparatus.

17. An electronic pointing device for determining a static position on a viewing screen of a computing device, the pointing device comprising:

an elastic member having an extended upper body portion and a planar bottom surface bonded to a base section, said elastic member for propagating vibrational pressure waves generated from a pressed point on said body portion;

at least three pressure sensing means disposed in said base section for detecting vibrational pressure waves propagated from said pressed point and providing position indicating signals in correspondence with said detected vibrational pressure waves;

first computing means for computing projected coordinates of said pressed point in accordance with said position indicating signals for defining orthogonal coordinates of said pressed point relative to a reference point of said planar bottom section; and biasing means for applying an equal bias to each of said at least three pressure sensing elements for generating output signals proportional to vibrational pressures generated from said pressed point.

18. An electronic pointing device as claimed in claim 17 wherein said biasing is applied to each of said at least three pressure sensing elements continually during a measuring period of said vibrational pressures.

19. An electronic pointing device as claimed in claim 17 wherein said biasing is applied periodically during a measuring period to each of said at least three pressure sensing elements.

20. An electronic pointing device as claimed in claim 17 wherein said biasing is applied as biasing current pulses.

21. An electronic pointing device for determining a position on a viewing screen of a computing device, the pointing device comprising:

an elastomeric member having an extended upper body portion and a planar bottom surface bonded to a base section, said elastic member for propagating vibrational pressure waves generated from a pressed point on said body portion, said vibrational pressure waves attenuating as they propagate across said elastic member;

a plurality of pressure sensors disposed in equal lateral positions in said base section for detecting attenuated results of said vibrational pressure waves propagated from said pressed joint;

transducers for providing position indicating signals in correspondence with said detected vibrational pressure waves; and computational means for computing projected coordinates of said pressed point in accordance with said position indicating signal for defining orthogonal coordinates of said pressed point relative to a reference point of said planar bottom section.

22. An electronic pointing device for determining a position on a viewing screen of a computing device, the pointing device comprising:

an elastomeric member having an extended upper body portion and a planar bottom surface bonded to a base section, said elastic member for propagating vibrational pressure waves generated from a pressed point on said body portion;

a plurality of pressure sensors disposed in equal lateral positions in said base section for detecting vibrational pressure waves propagated from said pressed joint;

transducers for providing position indicating signals in correspondence with said detected vibrational pressure waves; and computational means for computing projected coordinates of said pressed point in accordance with said position indicating signal for defining orthogonal coordinates of said pressed point relative to a reference point of said planar bottom section, said computational means comprising calibration means for increasing accuracy of position determination of said pressed point for correcting differences in performance of individual pressure sensors due to difference in the physical characteristics by sequentially selecting groups of said pressure sensors excluding at least one thereof wherein the total number of selected groups are determined by the representation of $_nC_{n-1}$ where n is the number of said pressure sensors, said calibration means for computing projected coordinates of said pressed point in accordance with said position indicating signals for each of said selected groups and for determining any differences in voltage values among transducer means of said selected groups indicative of correction values corresponding to each of said pressure sensors having an equal response value for said pressed point.

23. The electronic pointing device of claim 22 wherein there are four of said pressure sensors with four different selected groups of three pressure sensors per group.

24. An electronic pointing device for determining a position on a viewing screen of a computing device, the pointing device comprising:

an elastomeric member having an extended upper body portion and a planar bottom surface bonded to a base section, said elastic member for propagating vibrational pressure waves generated from a pressed point on said body portion;

a plurality of pressure sensors disposed in equal lateral positions in said base section for detecting vibrational pressure waves propagated from said pressed joint;

transducers for providing position indicating signals in correspondence with said detected vibrational pressure waves; and computational means for computing projected coordinates of said pressed point in accordance with said position indicating signal for defining orthogonal coordinates of said pressed point relative to a reference point of said planar bottom section, said computational means comprising means for computing said position indicating signals at specified time intervals and computing a movement vector for indicating a positional change of said pressed point from a previously pressed point in a predetermined time interval.

25. A method of calibrating an electronic pointing device for increasing the accuracy for determining a coordinate position on a viewing screen of a computing device by correcting for differences in performance of individual pressure sensors employed in the pointing device due to difference in their physical characteristics, the pointing device having an elastomeric member having an extended upper body portion and a planar bottom surface bonded to a base section for propagating vibrational pressure waves generated from a pressed point on said body portion, a plurality of said pressure sensors disposed in equal lateral positions in said base section for detecting vibrational pressure waves propagated from said pressed point, and transducers for providing position indicating signals in correspondence with said detected vibrational pressure waves, comprising the steps of:

sequentially selecting groups of said pressure sensors excluding at least one thereof wherein the total number of selected groups are determined by the representation of $_nC_{n-1}$ where n is the number of said pressure sensors, computing projected coordinates of said pressed point in accordance with said position indicating signals for each of said selected groups, determining any differences in voltage values among transducers of said selected groups indicative of correction values corresponding to each of said pressure sensors having an equal response value for said pressed point, and utilizing said correction values in subsequent determinations of projected coordinates of pressure points.

\* \* \* \* \*

UNITED STATES PATENT AND TRADEMARK OFFICE
CERTIFICATE OF CORRECTION

PATENT NO.     : 5,691,747
DATED          : November 25, 1997
INVENTOR(S)    : Kazuhiko Amano It is certified that errors appear in the above identified patent and that said Letters Patent is hereby corrected as shown below:

Column 19, line 34, change "point" to --pointing--.

line 56, insert --pointing-- before "device".

Column 20, line 32, change "equidisitantly" to --equidistantly--.

line 37, change "result" to --results--.

Column 21, line 64, change "a" to --an--.

Signed and Sealed this

Twelfth Day of May, 1998

Attest:

BRUCE LEHMAN

*Attesting Officer*       *Commissioner of Patents and Trademarks*